United States Patent
Ishii et al.

(10) Patent No.: US 11,893,082 B2
(45) Date of Patent: Feb. 6, 2024

(54) INFORMATION PROCESSING METHOD AND INFORMATION PROCESSING SYSTEM

(71) Applicant: Panasonic Intellectual Property Corporation of America, Torrance, CA (US)

(72) Inventors: Yasunori Ishii, Osaka (JP); Hiroaki Urabe, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 900 days.

(21) Appl. No.: 16/543,022

(22) Filed: Aug. 16, 2019

(65) Prior Publication Data

US 2020/0074231 A1 Mar. 5, 2020

(30) Foreign Application Priority Data

Aug. 29, 2018 (JP) .................................. 2018-159833
Apr. 10, 2019 (JP) .................................. 2019-075031

(51) Int. Cl.
*G06N 20/00* (2019.01)
*G06F 18/214* (2023.01)
*G06F 18/21* (2023.01)

(52) U.S. Cl.
CPC .......... *G06F 18/214* (2023.01); *G06F 18/217* (2023.01); *G06F 18/2148* (2023.01); *G06N 20/00* (2019.01)

(58) Field of Classification Search
CPC .. G06K 9/6257; G06K 9/6262; G06K 9/6256; G06N 20/00; G06V 10/758
See application file for complete search history.

(56) References Cited

U.S. PATENT DOCUMENTS

2012/0288186 A1* 11/2012 Kohli ................... G06K 9/6255
382/159
2017/0061664 A1 3/2017 Ishii et al.
(Continued)

FOREIGN PATENT DOCUMENTS

JP 2004-213567 A 7/2004
JP 2016-143354 A 8/2016
(Continued)

OTHER PUBLICATIONS

Cao, Xianbin, et al. "Rapid pedestrian detection in unseen scenes." Neurocomputing 74.17 (2011): 3343-3350. https://www.sciencedirect.com/science/article/pii/S0925231211003535 (Year: 2011).*
(Continued)

*Primary Examiner* — John Villecco
*Assistant Examiner* — Han Hoang
(74) *Attorney, Agent, or Firm* — Wenderoth, Lind & Ponack, L.L.P.

(57) ABSTRACT

An information processing method includes: obtaining sensing data; determining a synthesis region in the sensing data in which recognition target data is to be synthesized with the sensing data; generating composite data by synthesizing the recognition target data into the synthesis region, the recognition target data having same or similar characteristics perceived by a human sensory system as the sensing data; obtaining recognition result data by providing the composite data to a model which has been trained using machine learning to recognize a recognition target; making a second determination based on the recognition result data and reference data including at least the synthesis region, the second determination being to determine whether to make a first determination, the first determination being to determine training data for the model based on the composite data; and making the first determination when it is deter- (Continued)

mined in the second determination to make the first determination.

18 Claims, 11 Drawing Sheets

(56)  References Cited

U.S. PATENT DOCUMENTS

2019/0026906 A1    1/2019  Kawai
2019/0221121 A1*   7/2019  Guo ..................... H04W 4/46

FOREIGN PATENT DOCUMENTS

JP        2017-45441 A      3/2017
WO        2017/154630       9/2017
WO        2018/066351       4/2018

OTHER PUBLICATIONS

Extended European Search Report dated Feb. 17, 2020 in corresponding European Patent Application No. 19191911.7.
Ouyang et al., "Pedestrian-Synthesis-GAN : Generating Pedestrian Data in Real Scene and Beyond", pp. 1-22, XP055637970, Apr. 2018.
Wang et al., "Adversarial Generation of Training Examples: Applications to Moving Vehicle License Plate Recognition", XP081282087, Jul. 2017.
Naofumi Akimoto et al., "Natural Image Synthesis by Color Adjustment and Image Completion Considering Global Consistency", IPSJ SIG technical report, vol. 2018-CVIM-212 No. 8, May 10, 2018, with Partial translation, 9 pages.

* cited by examiner

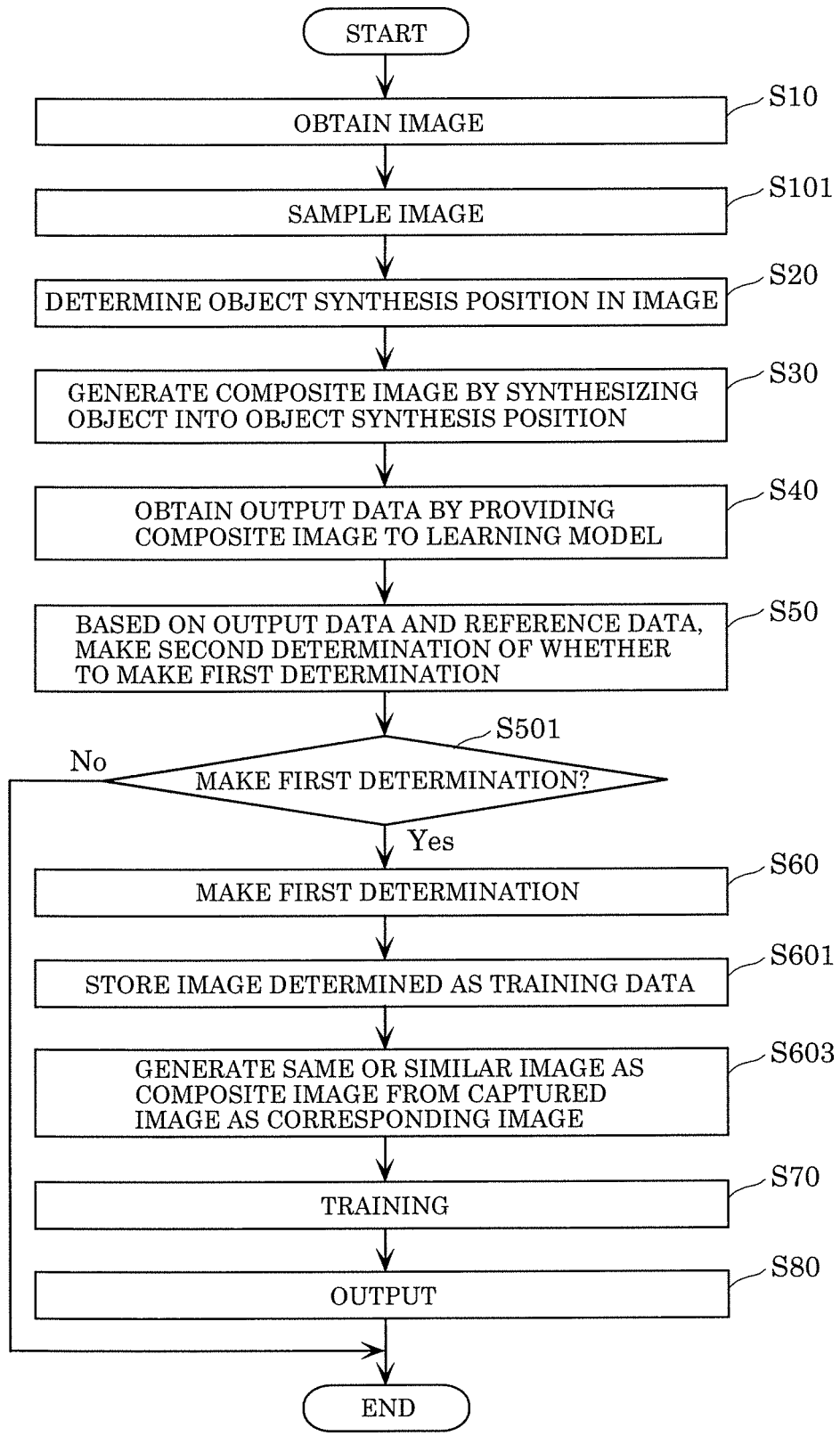

INFORMATION PROCESSING METHOD AND INFORMATION PROCESSING SYSTEM

CROSS REFERENCE TO RELATED APPLICATIONS

This application claims the benefit of priority of Japanese Patent Application Number 2018-159833 filed on Aug. 29, 2018 and Japanese Patent Application Number 2019-075031 filed on Apr. 10, 2019, the entire contents of which are hereby incorporated by reference.

BACKGROUND

1. Technical Field

This disclosure relates to an information processing method and an information processing system.

2. Description of the Related Art

In configuration of a data set for machine learning (hereinafter, also referred to as training data set or learning data set) or the like, a method of generating a composite image is proposed as a method of preparing a sufficient amount of data (hereinafter, also referred to as training data or learning data). For example, WO 2018/066351 discloses a simulation system, etc. that increases the number of learning samples by using different types of sensors in combination to generate a computer graphics (CG) image based on information obtained from these sensors. Furthermore, for example, WO 2017/154630 discloses an image processing apparatus, etc. that uses, as learning data, a difference image between a background image and an image obtained by capturing an object having a part similar in at least one of a hue and brightness to the background image.

SUMMARY

In the foregoing conventional techniques, the generated training data is not always beneficial to an individual model trained using machine learning (hereinafter, also referred to as a trained model or a learning model). Therefore, the foregoing conventional techniques have difficulty improving the training efficiency of the individual model.

In view of this, the present disclosure provides an information processing method and an information processing system which are capable of improving the individual training efficiency of the model trained using the machine learning.

An information processing method according to a non-limited exemplary aspect of the present disclosure includes: obtaining sensing data; determining a synthesis region in the sensing data in which recognition target data is to be synthesized with the sensing data; generating composite data by synthesizing the recognition target data into the synthesis region, the recognition target data having same or similar perceived characteristics perceived by a human sensory system as the sensing data; obtaining recognition result data by providing the composite data to a model which has been trained using machine learning to recognize a recognition target; making a second determination based on the recognition result data and reference data (label data or correct data) including at least the synthesis region, the second determination being to determine whether to make a first determination, the first determination being to determine training data for the model based on the composite data; and making the first determination when it is determined in the second determination to make the first determination.

It is to be noted that this general or specific aspect may be implemented using a system, a device, a method, an integrated circuit, a computer program, or a recording medium such as a computer readable recording disc, or any combination of systems, devices, methods, integrated circuits, computer programs, or recording media. The computer readable recording medium includes a non-volatile recording medium such as a compact disc-read only memory (CD-ROM). The additional benefit and advantage of an aspect of the present disclosure are disclosed in this description and the accompanying drawings. The benefit and/or advantage can be provided individually by various aspects and characteristics disclosed in this description and the drawings, and all the aspects and characteristics are not needed to obtain one or more benefits and/or advantages.

The information processing method, etc. according to the present disclosure can improve the individual training efficiency of the model trained using the machine learning.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 11 is a flow chart illustrating exemplary steps of an information processing method according to variation 3.

DETAILED DESCRIPTION OF THE EMBODIMENT

Figure 1:
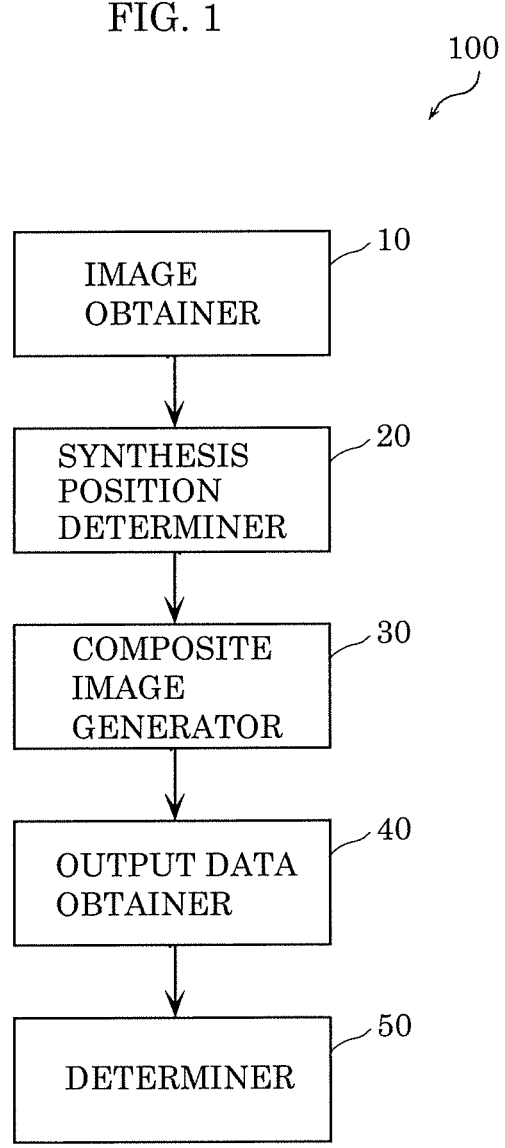
FIG. 1 is a block diagram illustrating an exemplary configuration of an information processing system according to an embodiment.

An aspect of the present disclosure will be described briefly below.

An information processing method according to an aspect of the present disclosure includes: obtaining sensing data; determining a synthesis region in the sensing data in which recognition target data is to be synthesized with the sensing data; generating composite data by synthesizing the recognition target data into the synthesis region, the recognition target data having same or similar perceived characteristics perceived by a human sensory system as the sensing data; obtaining recognition result data by providing the composite data to a model which has been trained using machine learning to recognize a recognition target; making a second determination based on the recognition result data and reference data including at least the synthesis region, the second determination being to determine whether to make a first determination, the first determination being to determine training data for the model based on the composite data; and making the first determination when it is determined in the second determination to make the first determination. In this case, the perceived characteristics of the sensing data may be statistical characteristics of an element of the sensing data. Furthermore, the perceived characteristics of the sensing data may be qualitative characteristics of the sensing data.

According to the above aspect, for example, when the sensing data is an image, a recognition target (e.g. an object) data is synthesized into a desired synthesis region in the image, and thus it is unnecessary to newly add annotations indicating the coordinates of the synthesis region (e.g. the object synthesis position), a type of the object, etc. to the synthesized data (described as the composite image here). Accordingly, it is possible to shorten the time needed for a series of information processes for creating reference data. Furthermore, according to the above aspect, the object data is synthesized into a desired size and position in the image, and thus information such as coordinates of the object synthesis position can be used as the reference data of when the composite image is provided to the learning model (hereinafter, also referred to as the recognition model). Accordingly, a composite image having a low recognition accuracy of the learning model can be identified by comparing the reference data and the output data obtained by proving, to the learning model, the composite image generated by synthesizing the object into the object synthesis position. With this, based on the composite image having a low recognition accuracy of the learning model, the composite image or an image similar to the composite image can be used as the training data for the learning model. Therefore, it is possible to improve the individual training efficiency of the learning model. In other words, although the processing of machine learning is difficult to converge when data unbeneficial to the machine learning is included, according to this embodiment, data beneficial to the machine training is identified and used as the training data, and thus the processing of machine learning is easy to converge. This improves the individual training efficiency of the learning model. For example, it is possible to improve the recognition accuracy of the learning model in a shorter time than the case where all the generated composite images are used as the training data for the learning model. Furthermore, according to the above aspect, an object having the same or similar characteristics perceived by a human sensory system (e.g. visual characteristics) as an image is synthesized into the object synthesis position, and thus, when the image is an image actually captured by a camera, etc. (hereinafter, referred to as a captured image), it is possible to obtain a seamless composite image close to the captured image. Accordingly, the learning model which has learned through machine learning using this composite image as the training data can obtain the recognition accuracy closer to that of when the captured image is used as the training data. It should be noted that for example, the object having the same or similar visual characteristics as the image may be an object that is the same or similar in image color tone, image edge, etc. included in the statistical characteristics of an element (e.g. an image parameter) of the image, or may be an object that is the same or similar in weather condition such as rain or snow, road surface condition due to the weather condition, occlusion, etc. included in the qualitative characteristics of the image. The above characteristics of the object facilitate the integration with the image, and thus the composite image generated by synthesizing this object into the object synthesis position becomes a seamless image.

For example, in the information processing method according to an aspect of the present disclosure, in the first determination, the composite data may be determined as the training data for the model.

According to the above aspect, the composite image determined to have a low recognition accuracy of the learning model can be used as the training data. Accordingly, it is prevented that data having a high recognition accuracy of the learning model, i.e. data unnecessary as training data, is accumulated as the training data. Therefore, the cost to accumulate data is reduced. In other words, an image of a scene having a low recognition accuracy of the learning model can be mainly accumulated as training data, and thus it is possible to efficiently learn for the scene having a low recognition accuracy. Thus, the recognition accuracy of the learning model is further improved.

For example, in the information processing method according to an aspect of the present disclosure, in the first determination, corresponding data having same or similar perceived characteristics as the composite data may be determined as the training data for the model. In this case, the perceived characteristics of the composite data may be statistical characteristics of an element of the composite data. Furthermore, the perceived characteristics of the composite data may be qualitative characteristics of the composite data.

According to the above aspect, the corresponding image having the same or similar visual characteristics as the composite image is determined as the training data, and thus an image of the scene having a low recognition accuracy of the learning model and an image of a scene similar to the foregoing image can be used as the training data. Accordingly, it is possible to efficiently increase variations and the number of training data items for the scene having a low recognition accuracy. It should be noted that when the corresponding image is a captured image, it is possible to improve the learning effect in comparison with the case where the composite image is used as the training data. Furthermore, when the visual characteristics are statistical characteristics of an element (e.g. an image parameter) of the composite image, it is possible to efficiently increase variations and the number of training data items from statistical point of view. Furthermore, when the visual characteristics are qualitative characteristics of the composite image, it is possible to efficiently increase variations and the number of training data items having characteristics that are difficult to be quantified.

For example, in the information processing method according to an aspect of the present disclosure, the sensing data is an image, the recognition target is an object, the synthesis region is an object synthesis position in the image in which object data is synthesized with the image, the composite data is a composite image generated by synthesizing the object data into the object synthesis position, the object data having same or similar visual characteristics as the image, the recognition result data is object recognition result data obtained by providing the composite image to the model, the first determination is to determine the training data for the model based on the composite image, and the second determination may be made based on the object recognition result data and reference data including at least the object synthesis position. For example, the first determination is to determine, as the training data for the model, a corresponding image having same or similar visual characteristics as the composite image, the visual characteristics of the composite image are an aspect of the object in the composite image, and the visual characteristics of the corresponding image may be an aspect of a corresponding object having same or similar attributes as the object. In this case, the aspect may be a position of the object in the composite image. Furthermore, the aspect may be a posture of the object.

According to the above aspect, the visual characteristics of the composite image are the aspects of the object in the composite image, and thus for example, the training data is determined based on the composite image for which the object recognition accuracy of the learning model is determined to be low based on a difference in object aspect such as the position or posture of the object in the composite image. With this, an image of the scene having a low recognition accuracy of the learning model and an image of a scene similar to the foregoing image can be used as the training data. Accordingly, it is possible to efficiently increase variations and the number of training data items for the scene having a low recognition accuracy. The recognition model constructed using such training data is improved in the accuracy with which the object is recognized from the image.

For example, in the information processing method according to an aspect of the present disclosure, the synthesis region may further include a size of the object data synthesized with the image.

According to the above aspect, it is possible to obtain a more seamless composite data for the image.

For example, in the information processing method according to an aspect of the present disclosure, data having same or similar perceived characteristics as the composite data may be selected or generated as the corresponding data from sensing data different from the composite data.

According to the above aspect, the captured image can be used as the training data. Accordingly, it is possible to have a higher learning effect than the case where the composite image is used as the training data. It should be noted that the selection from among the captured images may be to determine whether an image is stored based on a predetermined condition every time the image is obtained, to sample an image from among the obtained images based on the predetermined condition, or to retrieve and extract a captured image satisfying the predetermined condition from among the captured images stored in a memory, a data base, etc. Furthermore, according to the above aspect, the corresponding image can be generated from a captured image. More specifically, an image of a scene having a low recognition accuracy of the recognition model and an image similar to this scene can be generated from the captured image. With this, the corresponding image can be generated even when the captured image is unavailable as the corresponding image without change, and thus it is possible to easily increase variations and the number of training data items.

For example, in the information processing method according to an aspect of the present disclosure, a generative adversarial network (GAN) model may be used to synthesize the recognition target data into the synthesis region.

According to the above aspect, it is possible to synthesize a desired object into a desired position, and further obtain a more seamless composite image close to the captured image. The use of such a composite image as the training data can enhance the object recognition accuracy of the learning model.

For example, the information processing method according to an aspect of the present disclosure may further include providing a notice to a user of the model when it is determined in the second determination to make the first determination. In this case, the notice may be related to a request to train the model using the training data determined. Furthermore, the information processing method according to an aspect of the present disclosure further includes training the model using the training data determined, in which the notice may be related to completion of the training.

According to the above aspect, when the training data for the learning model is determined based on the composite image, a notice is provided to a user of the learning model, and thus the user can know there is a scene having an object unrecognizable by the learning model. Furthermore, when the notice is related to a request to train the learning model, the user can determine timing of training of the learning model. Furthermore, when the notice is related to completion of the training, the user can know that the learning model has been updated by the training.

Furthermore, an information processing system according to an aspect of the present disclosure includes a first obtainer that obtains sensing data; a first determiner that determines a synthesis region in the sensing data in which recognition target data is synthesized with the sensing data; a generator that generates composite data by synthesizing the recognition target data into the synthesis region, the recognition target data having same or similar perceived characteristics perceived by a human sensory system as the sensing data; a second obtainer that obtains recognition result data by providing the composite data to a model which has been trained using machine learning to recognize a recognition target; and a second determiner that (i) makes a second determination based on the recognition result data and reference data including at least the synthesis region, the second determination being to determine whether to make a first determination, the first determination being to determine training data for the model based on the composite data, and (ii) makes the first determination when it is determined in the second determination to make the first determination.

According to the above aspect, for example, when the sensing data is an image, a recognition target (e.g. an object) data is synthesized into a desired synthesis region in the image, and thus it is unnecessary to newly add annotations indicating the coordinates of the synthesis region (e.g. the object synthesis position), a type of the object, etc. to the synthesized data (described as the composite image here). Accordingly, it is possible to shorten the time needed for a series of information processes for creating reference data. Furthermore, according to the above aspect, the object data is synthesized into a desired size and position in the image, and thus information such as coordinates of the object synthesis position can be used as the reference data of when the composite image is provided to the learning model (hereinafter, also referred to as the recognition model). Accordingly, a composite image having a low recognition accuracy of the learning model can be identified by comparing the reference data and the output data obtained by proving, to the learning model, the composite image generated by synthesizing the object into the object synthesis position. With this, based on the composite image having a low recognition accuracy of the learning model, the composite image or an image similar to the composite image can be used as the training data for the learning model. Therefore, it is possible to improve the individual training efficiency of the learning model. In other words, although the processing of machine learning is difficult to converge when data unbeneficial to the machine learning is included, according to this embodiment, data beneficial to the machine training is identified and used as the training data, and thus the processing of machine learning is easy to converge. This improves the individual training efficiency of the learning model. For example, it is possible to efficiently improve the recognition accuracy of the learning model in a shorter time than the case where all the generated composite images are used as the training data for the learning model. Furthermore, according to the above aspect, an object having the same or similar visual characteristics as the image is synthesized into the object synthesis position, and thus, when the image is a captured image actually captured by a camera, etc., it is possible to obtain a seamless composite image close to the captured image. Accordingly, the learning model which has learned through machine learning using this composite image as the training data can obtain the recognition accuracy closer to that of when the captured image is used as the training data.

It is to be noted that this general or specific aspect may be implemented using a system, a device, a method, an integrated circuit, a computer program, or a recording medium such as a computer readable recording disc, or any combination of systems, devices, methods, integrated circuits, computer programs, or recording media. The computer readable recording medium includes a non-volatile recording medium such as a CD-ROM.

Hereinafter, the information processing method and the information processing system according to an embodiment of the present disclosure will be described in detail with reference to the drawings. It should be noted that an embodiment described below is a general or specific example. The numerical values, shapes, constituent elements, the arrangement and connection of the constituent elements, steps (processes), the processing order of the steps etc. shown in the embodiment described below are mere examples, and thus do not limit the present disclosure. Furthermore, among the constituent elements in the embodiment described below, constituent elements not recited in any of the independent claims indicating the most generic concept are described as preferable constituent elements. Furthermore, in the embodiment described below, a term with "substantially" such as substantially parallel or substantially orthogonal may be used. For example, substantially parallel refers to not only completely parallel but also nearly parallel, i.e., there may be a difference of a few percent. The same is true of other terms with "substantially". Furthermore, in the embodiment described below, two similar elements mean that, for example, the two elements are the same in half or more or a main portion, or the two elements have common characteristics. Furthermore, the figures are schematic drawings, and are not necessarily exact depictions. In the figures, constituent elements having essentially the same configuration share like reference numbers. Accordingly, overlapping descriptions thereof are omitted or simplified.

Embodiment (Configuration and Operation of Information Processing System According to Embodiment)

Figure 2:
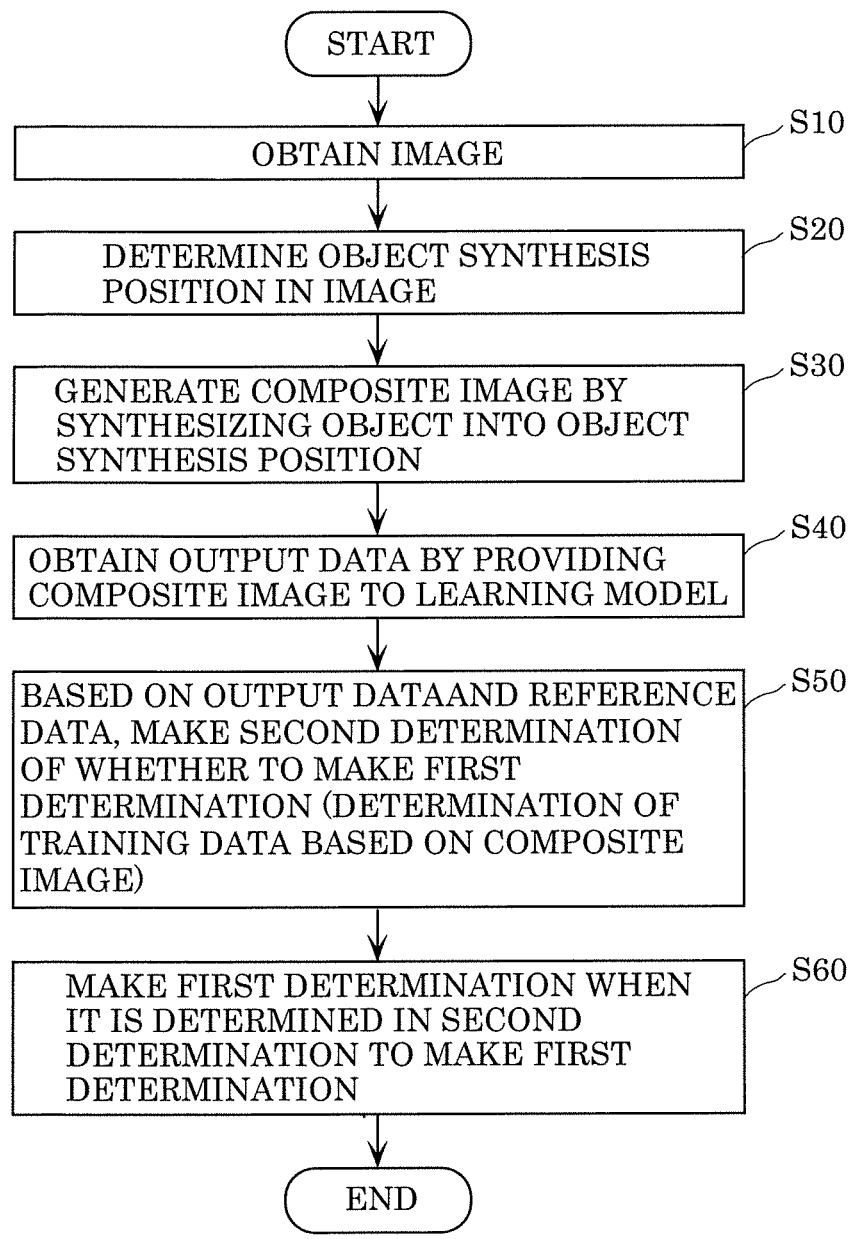
FIG. 2 is a flow chart illustrating exemplary steps of the information processing method according to the embodiment.

The configuration and operation of an information processing system according to an embodiment will be described with reference to FIGS. 1 and 2. FIG. 1 is a block diagram illustrating an exemplary configuration of information processing system 100 according to this embodiment. FIG. 2 is a flow chart illustrating exemplary steps of the information processing method according to this embodiment.

As shown in FIG. 1, information processing system 100 includes image obtainer 10 (image obtaining unit 10), synthesis position determiner 20 (synthesis position determining unit 20) that determines an object synthesis position in an image, composite image generator 30 (composite image generating unit 30), output data obtainer 40 (output data obtaining unit 40) that obtains output data by providing a composite image to a learning model (hereinafter, referred to as a recognition model), and determiner 50 (determining unit 50) that determines learning data for the recognition model.

It should be noted that image obtainer 10 is an example of a first obtainer that obtains sensing data. For example, the sensing data is an image. Furthermore, synthesis position determiner 20 is an example of a first determiner that determines a synthesis region in the sensing data in which recognition target data is to be synthesized with the sensing data (the synthesis region is described here as an object synthesis position). For example, the recognition target is an object. Furthermore, composite image generator 30 is an example of a generator that generates composite data by synthesizing, into the synthesis region, the recognition target data having the same or similar characteristics perceived by a human sensory system as the sensing data. For example, the synthesis region is an object synthesis position in the image in which object data is to be synthesized with the image, and the composite data is a composite image. Furthermore, output data obtainer 40 is an example of a second obtainer that obtains recognition result data by providing the composite data to a model which has been trained using machine learning to recognize a recognition target (hereinafter, also referred to as a recognition model or learning model). For example, the recognition result data is object recognition result data obtained by providing the composite image to the recognition model.

As shown in FIGS. 1 and 2, image obtainer 10 obtains a captured image (S10 in FIG. 2). The obtaining may be, for example, to obtain an image captured by an imaging device (hereinafter, also referred to as a captured image) or to obtain a captured image by taking an image. In the former case, image obtainer 10 is, for example, a receiver which receives an image captured by the imaging device in communication. Furthermore, in the latter case, image obtainer 10 is, for example, an imaging unit such as a camera with which an image is taken.

Synthesis position determiner 20 determines the object synthesis position in the image obtained by image obtainer 10, in which the object data is to be synthesized with the image (S20 in FIG. 2). The object synthesized with the image includes, for example, movable objects such as humans, animals, and vehicles, and static objects such as plants and road accessories. The position in the image in which the object data is to be synthesized with the image is determined as desired. The object synthesis position may further include a size of the object data synthesized with the image.

Composite image generator 30 generates a composite image by synthesizing, into the object synthesis position, the object data having same or similar visual characteristics as the captured image (S30 in FIG. 2). The visual characteristics of the captured image are statistical characteristics of an element of the captured image (hereinafter, also referred to as an image parameter). The statistical characteristics of the image parameter include, for example, color tone, brightness, and edge of an image. Furthermore, the visual characteristics of the captured image are qualitative characteristics of the captured image. The qualitative characteristics of the image means characteristics of the image which are difficult to be quantified, and includes, for example, a weather condition such as rain or snow, a road surface condition in association with the weather condition (e.g. a wet road surface condition due to rain), and occlusion.

Composite image generator 30 uses, for example, a generative adversarial network (GAN) model to synthesize the object into the object synthesis position. With this, in the generated composite image, the synthesized object and background are the same or similar in color tone and brightness. In other words, the statistical characteristics of the image parameter are the same or similar between the object synthesized with a captured image and the captured image. Accordingly, it is possible to synthesize a desired object into a desired position, and further obtain a more seamless composite image close to the captured image. It should be noted that a method of generating a composite image using GAN will be described below. Furthermore, GAN is one example. The method of generating a composite image is not particularly limited. The method of generating a composite image is sufficient as long as a more seamless composite image close to the captured image can be obtained.

Output data obtainer 40 obtains object recognition result data (i.e. output data of the recognition model) by providing the composite image obtained by composite image generator 30 to the recognition model (S40 in FIG. 2).

Based on the output data and reference data, determiner 50 makes a second determination which is to determine whether to make a first determination. More specifically, determiner 50 makes a second determination based on the output data and reference data including at least the synthesis region, in which the second determination is to determine whether to make a first determination and the first determination is to determine training data for the recognition model based on the composite image (S50 in FIG. 2). The reference data includes, for example, information on coordinates indicating a region of the object synthesis position, a type of the object, a posture of the object, etc. Based on a difference between the output data and the reference data, determiner 50 determines the accuracy of recognizing the object synthesized into the object synthesis position (hereinafter, referred to as an object recognition accuracy). When it is determined in the second determination to make the first determination, determiner 50 makes the first determination (S60 in FIG. 2). More specifically, when the object recognition accuracy of the recognition model is lower than a predetermined threshold, determiner 50 determines, as the training data for the recognition model, a composite image provided to the recognition model and the same or similar image as the composite image. As described above, information processing system 100 causes the recognition model to learn using the training data, and thereby constructs the recognition model whose object recognition accuracy is improved. The recognition model according to this embodiment is a machine learning model using a neural network such as deep learning, but may be another learning model. For example, the other learning model may be a machine learning model using support vector machine, boosting, random forest, genetic programming, etc.

Figure 3:
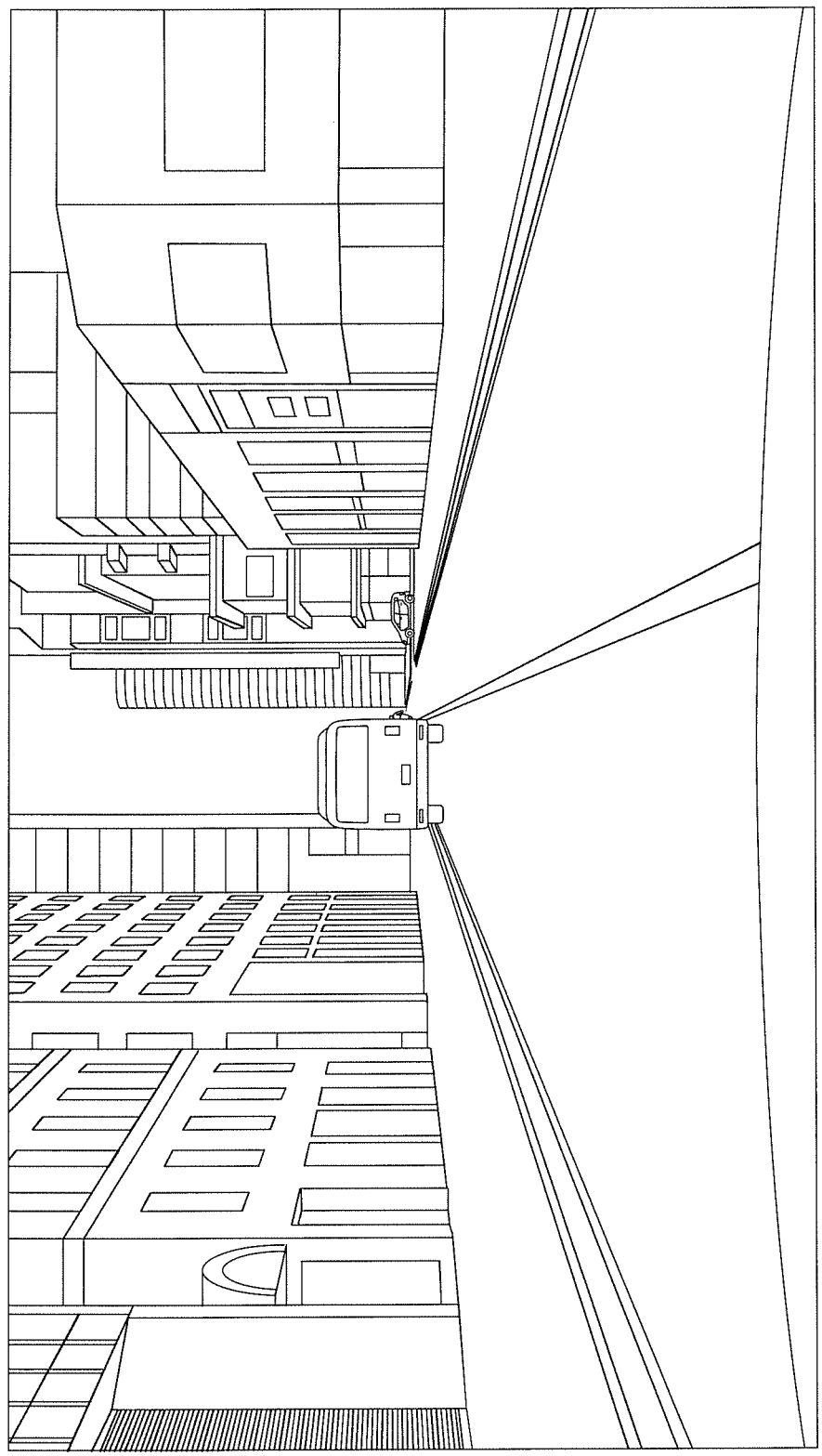
FIG. 3 is a diagram illustrating a captured image obtained by an image obtainer.
Figure 4:
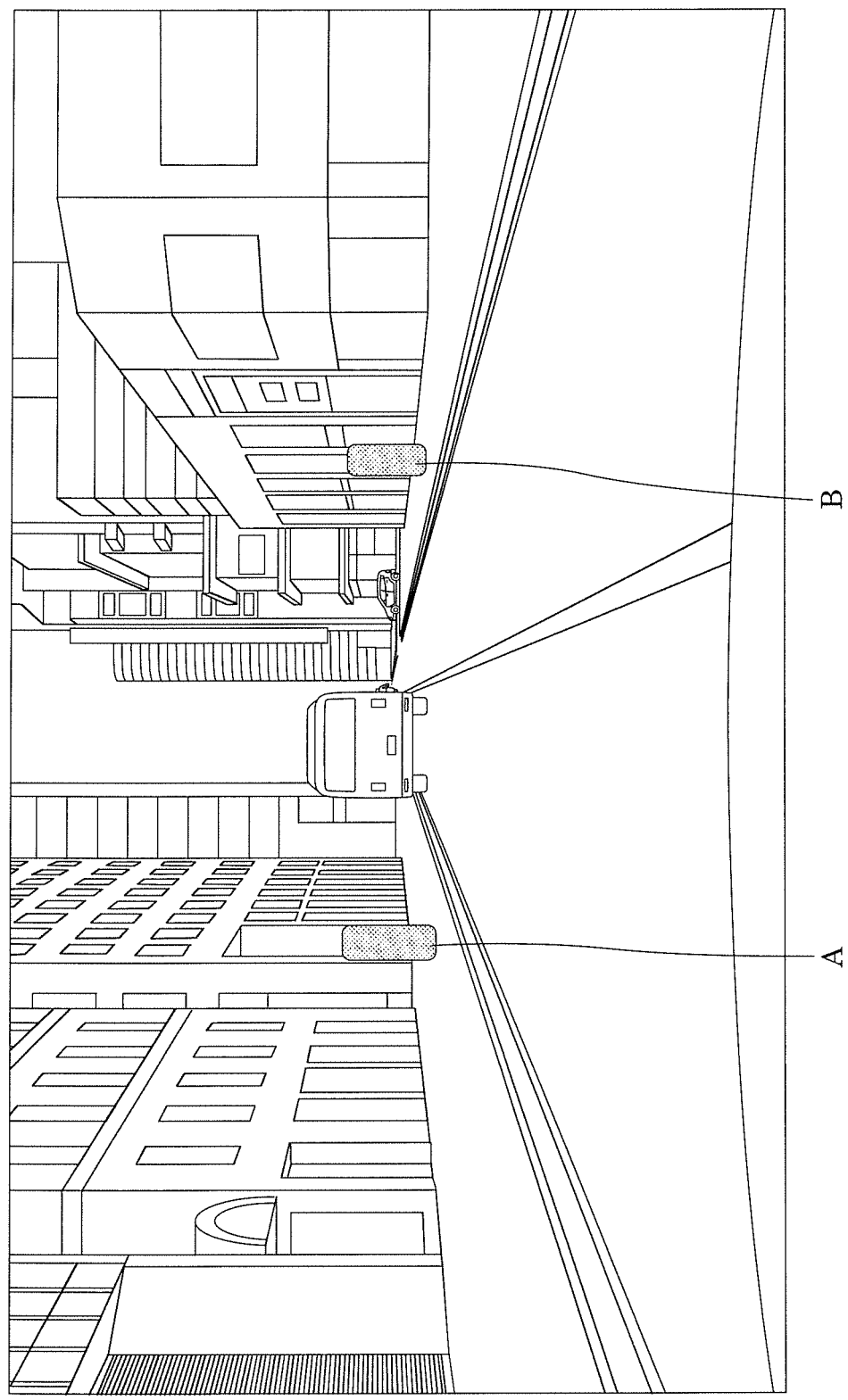
FIG. 4 is a diagram illustrating the captured image in which an object synthesis position is determined by a synthesis position determiner.
Figure 5:
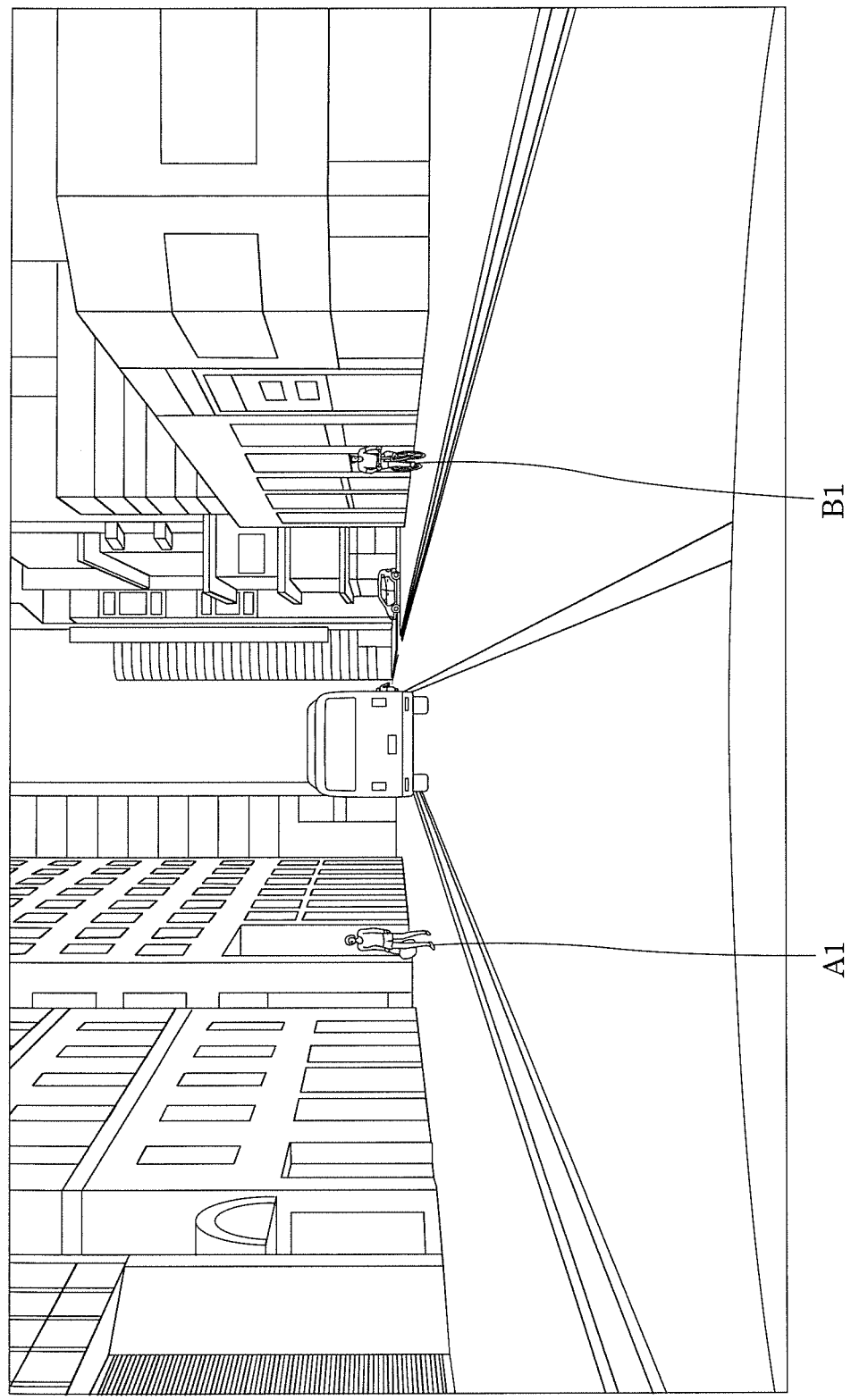
FIG. 5 is a diagram illustrating a composite image generated by synthesizing an object into the object synthesis position in a composite image generator.

With reference to FIGS. 3 to 5, the following describes an exemplary procedure from obtaining the captured image to generating the composite image in information processing system 100 according to this embodiment. FIG. 3 is a diagram illustrating the captured image obtained by image obtainer 10. FIG. 4 is a diagram illustrating the captured image in which the object synthesis position is determined by synthesis position determiner 20. FIG. 5 is a diagram illustrating the composite image generated by synthesizing an object into the object synthesis position in composite image generator 30. Here, an example of synthesizing the object into the object synthesis position using the GAN model will be described.

Image obtainer 10 obtains the capture image shown in FIG. 3. This captured image is, for example, an image captured by an in-vehicle camera.

Next, as shown in FIG. 4, synthesis position determiner 20 determines object synthesis position A and object synthesis position B in which the object is to be synthesized with the captured image. Object synthesis position A and object synthesis position B are each a position determined as desired. In the GAN model, noise is generated in object synthesis position A and object synthesis position B in the captured image.

Next, as shown in FIG. 5, composite image generator 30 synthesizes an image having a different generator into each of object synthesis position A and object synthesis position B in which noise is generated. The image having a different generator includes, for example, an image of a person whose sex, age, clothing, posture, etc. is different, an image of a person driving a vehicle such as a bicycle, and an image in which a person is standing by a car, etc. Based on these generators, a predetermined object is synthesized into a predetermined object synthesis position. For example, as shown in FIG. 5, pedestrian A1 is synthesized into object synthesis position A, and person B1 riding a bicycle is synthesized into object synthesis position B.

It should be noted that the GAN model determines whether the object synthesized into the object synthesis position is recognizable as a person, and whether the object synthesized into the object synthesis position is integrated with the background. For example, even if the synthesized object is determined to be recognizable as a person, when the synthesized object is determined not to be integrated with the background, the generator is adjusted and the object is synthesized into the object synthesis position again. With this, it is possible to obtain a seamless composite image close to the original captured image as a whole.

As described above, in this embodiment, the object is synthesized into a desired object synthesis position in the captured image, and thus it is unnecessary to add annotations indicating the coordinates of the object synthesis position, a type of the object, etc. to the composite image. Accordingly, it is possible to shorten the time needed for a series of information processes for creating reference data. Furthermore, in this embodiment, the object is synthesized into the desired object synthesis position in the captured image, and thus information such as coordinates of the object synthesis position can be used as the reference data of when the composite image is provided to the learning model (also referred to as the recognition model). Accordingly, a composite image having a low recognition accuracy of the learning model can be identified by comparing the reference data and the output data obtained by proving, to the learning model, the composite image generated by synthesizing the object into the object synthesis position. With this, based on a composite image having a low recognition accuracy of the learning model, the composite image or an image similar to the composite image can be used as the training data for the learning model. Therefore, it is possible to improve the individual training efficiency of the learning model in comparison with the case where all the generated composite images are used as the training data for the learning model. In other words, although the processing of machine learning is difficult to converge when data unbeneficial to the machine learning is included, according to this embodiment, data beneficial to the machine training is identified and used as the training data, and thus the processing of machine learning is easy to converge. This improves the individual training efficiency of the learning model. For example, it is possible to improve the recognition accuracy of the learning model in a short time.

Furthermore, in this embodiment, an object having the same or similar characteristics perceived by a human sensory system (described as visual characteristics here) as an image is synthesized into the object synthesis position, and thus, when the image is a captured image actually captured by a camera, etc., it is possible to obtain a seamless composite image close to the captured image. Accordingly, the learning model which has learned using this composite image as the training data can obtain the recognition accuracy closer to that of when the captured image is used as the training data.

As described above, information processing system 100 includes: image obtainer 10 that obtains an image; synthesis position determiner 20 that determines an object synthesis position in the image; composite image generator 30 that generates a composite image by synthesizing an object having the same or similar visual characteristics as the image; output data obtainer 40 that obtains output data of the learning model by providing the composite image to the learning model; and determiner 50 that (i) makes a second determination based on the output data and reference data including at least the object synthesis position, in which the second determination is to determine whether to make a first determination and the first determination is to determine training data for the model based on the composite data, and (ii) makes the first determination when it is determined in the second determination to make the first determination. In this case, the visual characteristics of the image are statistical characteristics of the image parameter of the image. Furthermore, the visual characteristics of the image are qualitative characteristics of the image.

Furthermore, an information processing method according to this embodiment includes: obtaining an image (S10); determining an object synthesis position in the image (S20); generating a composite image by synthesizing an object having the same or similar visual characteristics as the image (S30); obtaining output data of the learning model by providing the composite image to the learning model (S40); making a second determination based on the output data and reference data including at least the object synthesis position, in which the second determination is to determine whether to make a first determination and the first determination is to determine training data for the learning model based on the composite image (S50); and making the first determination when it is determined in the second determination to make the first determination (S60).

With this, the object is synthesized into a desired object synthesis position in the image, and thus it is possible to use information such as coordinates of the object synthesis position as the reference data for the learning model. Accordingly, a composite image having a low recognition accuracy of the learning model can be identified by comparing the reference data and the output data obtained by proving, to the learning model, the composite image generated by synthesizing the object into the object synthesis position. With this, based on a composite image having a low recognition accuracy of the learning model, the composite image or an image similar to the composite image can be used as the training data for the learning model. Therefore, it is possible to improve the individual training efficiency of the learning model. In other words, although the processing of machine learning is difficult to converge when data unbeneficial to the machine learning is included, according to this embodiment, data beneficial to the machine training is identified and used as the training data, and thus the processing of machine learning is easy to converge. This improves the individual training efficiency of the learning model. For example, it is possible to efficiently improve the recognition accuracy of the learning model in a shorter time than the case where all the generated composite images are used as the training data for the learning model. Furthermore, in this embodiment, an object having the same or similar visual characteristics as the image is synthesized into the object synthesis position, and thus, when the image is a captured image actually captured by a camera, etc., it is possible to obtain a seamless composite image close to the captured image. Accordingly, the learning model which has learned using this composite image as the training data can obtain the recognition accuracy closer to that of when the captured image is used as the training data.

It should be noted that for example, the object having the same or similar visual characteristics as the image may be an object that is the same or similar in image color tone, image edge, etc. included in the statistical characteristics of the image parameter of the image, or may be an object that is the same or similar in weather condition such as rain or snow, road surface condition due to the weather condition, occlusion, etc. included in the qualitative characteristics of the image. The above characteristics of the object facilitate the integration with the image, and thus the composite image generated by synthesizing this object into the object synthesis position becomes a seamless image.

Variation 1

(Configuration of Information Processing System According to Variation 1)

Figure 6:
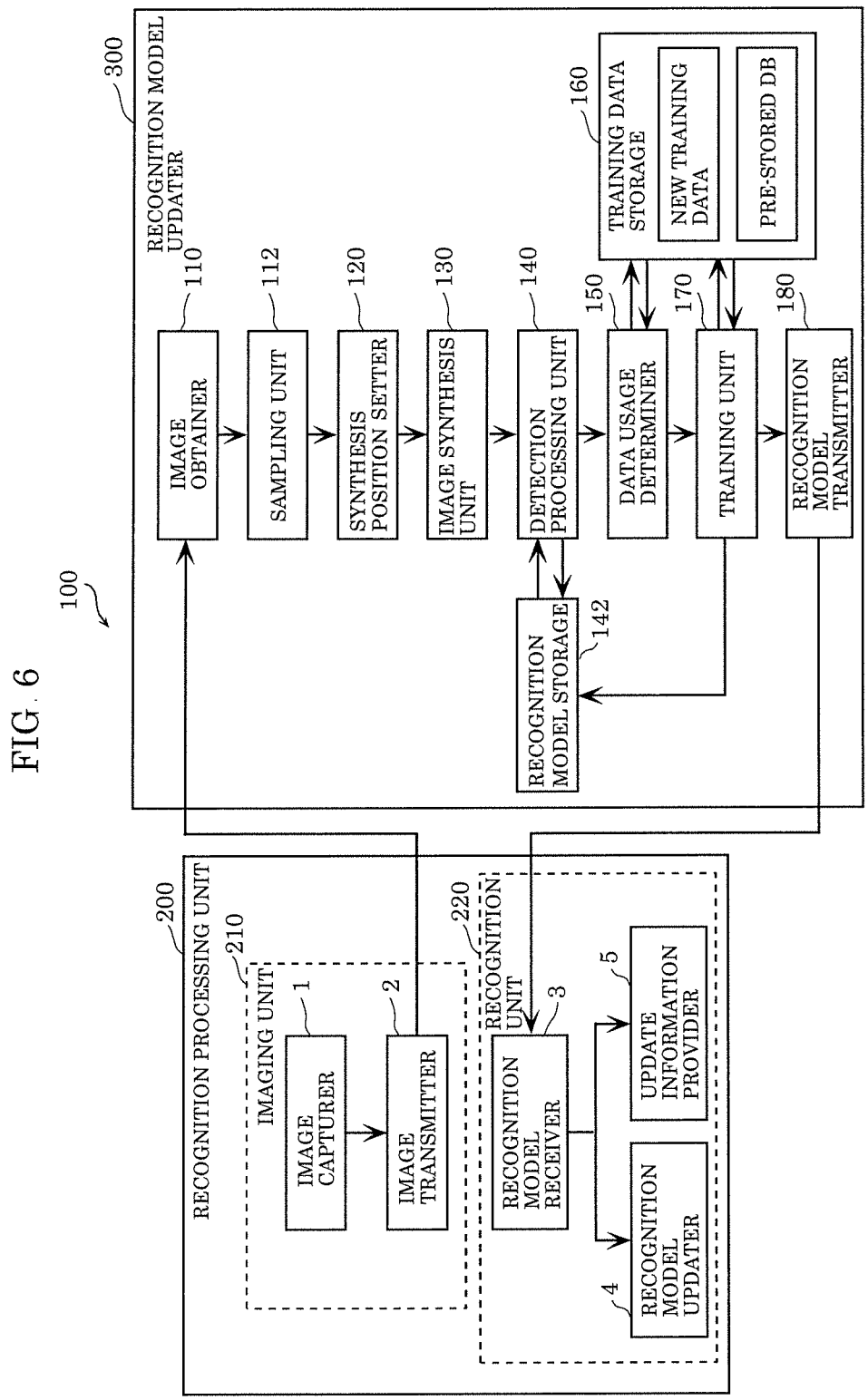
FIG. 6 is a block diagram illustrating an exemplary configuration of an information processing system according to variation 1.

An information processing system according to variation 1 of the embodiment will be described with reference to FIG. 6. FIG. 6 is a block diagram illustrating an exemplary configuration of information processing system 100 according to variation 1.

It should be noted that in information processing system 100 according to the embodiment, image obtainer 10 has been described as a receiver that obtains an image or an imaging unit that takes an image, but in variation 1, image obtainer 10 will be described as a receiver that receives a captured image.

Information processing system 100 according to variation 1 includes recognition processing unit 200 including imaging unit 210 and recognition unit 220, and recognition model updater 300 (recognition model updating unit 300).

Information processing system 100 according to variation 1 generates a composite image by synthesizing an object having the same or similar visual characteristics as an image captured by imaging unit 210 (hereinafter, also referred to as a captured image) into the captured image, adds annotation to the synthesized object in the composite image, and determines the training data for constructing the recognition model. Furthermore, information processing system 100 uses the training data determined based on the composite image to construct the recognition model for detecting the object from an image. A learning model described below is applied to the construction of the recognition model. The training data is data for use in learning of the recognition model (i.e. machine learning training of the recognition model). The training data includes a composite image, and information on details of the object in the composite image such as a type and an operation, and the position and region of the object.

Recognition processing unit 200 receives the recognition model constructed through training by recognition model updater 300, via recognition model receiver 3 in recognition unit 220. The recognition model received by recognition model receiver 3 is provided to recognition model updater 4 to update the recognition model. When the recognition model is updated, update information provider 5 provides a notice that the recognition model has been updated. This notice may be provided as sound, or may be displayed on a screen as an image. Furthermore, recognition unit 220 recognizes the object included in the image captured by imaging unit 210. It should be noted that recognition processing unit 200 may inform a user by outputting the object recognition result as sound or an image.

The following describes recognition processing unit 200 as being included in a movable body, more specifically a car, and recognition model updater 300 as being included in a server separate from the car. Recognition processing unit 200 in the car and the server are connected via a wireless communication, and wirelessly communicate with each other through a communication network such as the Internet. Recognition processing unit 200 and recognition model updater 300 transmit and receive information via the wireless communication. The wireless communication may employ a wireless local area network (LAN) such as wireless fidelity (Wi-Fi (registered mark)), or other wireless communications. The server may be an information processing device such as a computer. The server may include one or more servers, and may build a cloud system.

Information processing system 100 may include a wireless communication device such as a communication circuit, or may use a wireless communication device included in the server. Information processing unit 200 may include a wireless communication device such as a communication circuit, or may use a wireless communication device included in the car. It should be noted that recognition processing unit 200 and recognition model updater 300 may be connected via not a wireless communication but a wired communication, or may intercommunicate information via a recoding medium such as a non-volatile memory.

Furthermore, when the computer included in the car is compatible, recognition model updater 300 may be included in the car. In this case, recognition model updater 300 and recognition processing unit 200 may be integrated. Besides, recognition model updater 300 may intercommunicate information with the outside of the car via the wireless communication, the wired communication, or the recording medium.

With reference to FIG. 6, the detailed configuration of recognition processing unit 200 and recognition model updater 300 in information processing system 100 according to variation 1 will be further described. It should be noted that the following describes an example in which recognition model updater 300 uses the GAN model to generate a composite image.

In information processing system 100 according to variation 1, recognition processing unit 200 includes imaging unit 210 and recognition unit 220.

Imaging unit 210 is, for example, a camera, and includes image capturer 1 (image capturing unit 1) and image transmitter 2 (image transmitting unit 2). An image captured by imaging unit 210 is transmitted to image obtainer 110 in recognition model updater 300 via image transmitter 2.

Recognition unit 220 recognizes an object such as a person included in the image captured by imaging unit 210. Recognition unit 220 includes recognition model receiver 3 (recognition model receiving unit 3), recognition model updater 4 (recognition model updating unit 4), and update information provider 5 (update information providing unit 5). Recognition model receiver 3 receives the recognition model updated by recognition model updater 300, and provides the updated recognition model to recognition model updater 4. Recognition model updater 4 stores the recognition model provided from recognition model receiver 3, and thereby updates the recognition model. Update information provider 5 may be implemented by a display and/or a speaker, and provides a notice to a user of the recognition model when it is determined in the second determination to make the first determination. For example, when a predetermined amount of training data is stored in training data storage 160, update information provider 5 provides a notice related to a request to train the recognition model using the determined training data. Furthermore, for example, when the recognition model is trained in training unit 170 using the determined training data, update information provider 5 provides a notice related to completion of the training. Update information provider 5 also may inform the user that the recognition model stored in recognition unit 220 has been updated with the trained recognition model. In addition, update information provider 5 may inform the user of, for example, a difference between the updated recognition model and the previous recognition model and update information such as an effect obtained by updating. It should be noted that the display may be implemented by a display panel such as a liquid crystal panel, an organic or inorganic electro luminescence (EL).

Recognition model updater 300 includes image obtainer 110 (image obtaining unit 110), sampling unit 112, synthesis position setter 120 (synthesis position setting unit 120), image synthesis unit 130, detection processing unit 140, data usage determiner 150 (data usage determining unit 150), training unit 170, recognition model transmitter 180 (recognition model transmitting unit 180), training data storage 160 (training data storing unit 160), and recognition model storage 142 (recognition model storing unit 142).

Image obtainer 110 obtains the image transmitted form imaging unit 210. Image obtainer 110 provides the obtained image to sampling unit 112. Sampling unit 112 receives images provided from image obtainer 110, and for example, periodically samples an image from the received images, and provides the sampled image to synthesis position setter 120.

Synthesis position setter 120 is an example of synthesis position determiner 20 according to the embodiment (see FIG. 1), and determines the object synthesis position in the image sampled by sampling unit 112 as desired.

Image synthesis unit 130 is an example of composite image generator 30 according to the embodiment (see FIG. 1), and synthesizes the object into the object synthesis position determined by synthesis position setter 120. In this case, the GAN model is used as a method of synthesizing the object. It should be noted that the description of the GAN model is omitted here since it has already described in the embodiment.

Detection processing unit 140 is an example of output data obtainer 40 according to the embodiment (see FIG. 1), and obtains output data of the recognition model by providing the composite image generated by image synthesis unit 130 to recognition model storage 142. More specifically, detection processing unit 140 obtains output data of the recognition model by providing the composite image to the recognition model stored in recognition model storage 142. Detection processing unit 140 provides the obtained output data to data usage determiner 150.

Data usage determiner 150 is an example of determiner 50 according to the embodiment (see FIG. 1), and makes a second determination based on the output data and reference data including at least the object synthesis position. The second determination is to determine whether to make a first determination. The first determination is to determine training data for the recognition model based on the composite data. When the recognition accuracy of the recognition model determined from a difference between the output data and the reference data is higher than a predetermined threshold, data usage determiner 150 makes the second determination not to make the first determination. More specifically, in this case, data usage determiner 150 determines the composite image provided to the recognition model as an image recognizable by the recognition model, and makes the second determination not to determine the training data for the recognition model based on the composite image. According to the second determination result, data usage determiner 150 does not determine the training data for the recognition model based on the composite image.

On the other hand, when the recognition accuracy of the recognition model is lower than the predetermined threshold, data usage determiner 150 makes the second determination to make the first determination. More specifically, data usage determiner 150 determines the composite image provided to the recognition model as an image having the object unrecognizable by the recognition model, and makes the second determination to determine the training data for the recognition model based on the composite image. According to the second determination result, data usage determiner 150 determines the composite image as the training data. Data usage determiner 150 also determines, as the training data, a corresponding image having the same or similar visual characteristics as the composite image. The corresponding image may be selected or generated from the images stored in training data storage 160. Data usage determiner 150 stores the image determined as the training data, in training data storage 160 as new training data.

Here, the visual characteristics of the composite image are statistical characteristics of the image parameter of the composite image. Furthermore, the visual characteristics of the composite image are qualitative characteristics of the composite image. It should be noted that the description of the qualitative characteristics and the statistical characteristics of the image parameter are omitted since this description is the same as that of the embodiment.

Furthermore, the visual characteristics of the composite image are an aspect of the object in the composite image, and the visual characteristics of the corresponding image are an aspect of a corresponding object having the same or similar attributes as the object. For example, the aspect is a position of the object in the composite image. More specifically, the position of the object in the composite image is coordinates of the region occupied by the object. Furthermore, for example, the aspect is a posture of the object.

It should be noted that the attributes of the object are the characteristics of the object, and for example, includes a type, a shape, a color, a material of the object. More specifically, when the type of the object is a person, the attributes of the object may include sex, physical constitution, age, skin color, clothing, belongings, posture, age, face expression, etc. In addition, when the type of the object is a car, the attributes of the object may include a type, a shape, a body color, a window glass color, etc.

Training data storage 160 stores new training data, pre-stored data base (DB) including various images stored in advance as training data, etc. Besides the above data, training data storage 160 can store background information, object information, environment information such as weather, etc., and retrieve the stored information. Training data storage 160 is implemented by a semiconductor memory such as a random access memory (RAM) or a flash memory, a storage device such as a hard disk drive or a solid state drive (SSD), etc.

Training data storage 160 stores the composite image determined by data usage determiner 150 as the training data for the learning model, in association with information on the image synthesis position in the image. Training data storage 160 also stores the corresponding image determined by data usage determiner 150 based on the composite image as the training data, in association with information on the position of a corresponding object in the corresponding image. The corresponding object corresponds to the object synthesized into the composite image.

In response to receiving, from data usage determiner 150, a command to request the same or similar image as the composite image determined by data usage determiner 150 as the training data, training data storage 160 provides, to data usage determiner 150, the new training data stored in training data storage 160 and a desired image from the pre-stored DB. Furthermore, in response to receiving, from training unit 170, a command to request the training data, training data storage 160 provides, to training unit 170, the new training data stored in training data storage 160 and a desired image from the pre-stored DB.

Recognition model storage 142 stores the same recognition model as recognition unit 220. Recognition model storage 142 provides, to detection processing unit 140, output data obtained by providing the composite image generated by image synthesis unit 130 to the recognition model. Recognition model storage 142 obtains the recognition model trained by training unit 170, and updates the recognition model by storing it in recognition model storage 142.

Training unit 170 trains the recognition model using the training data determined by data usage determiner 150. For example, after a predetermined amount of new training data is stored in training data storage 160, training unit 170 retrieves training data from training data storage 160, and trains the recognition model by providing the retrieved training data to the recognition model stored in training unit 170. Training unit 170 provides the recognition model trained using machine learning to recognition model storage 142 and recognition model transmitter 180.

Recognition model transmitter 180 transmits the recognition model trained by training unit 170 to recognition unit 220 of recognition processing unit 200. When receiving the trained recognition model, recognition model receiver 3 of recognition unit 220 provides the trained recognition model to recognition model updater 4.

(Operation of Information Processing System According to Variation 1)

Figure 7:
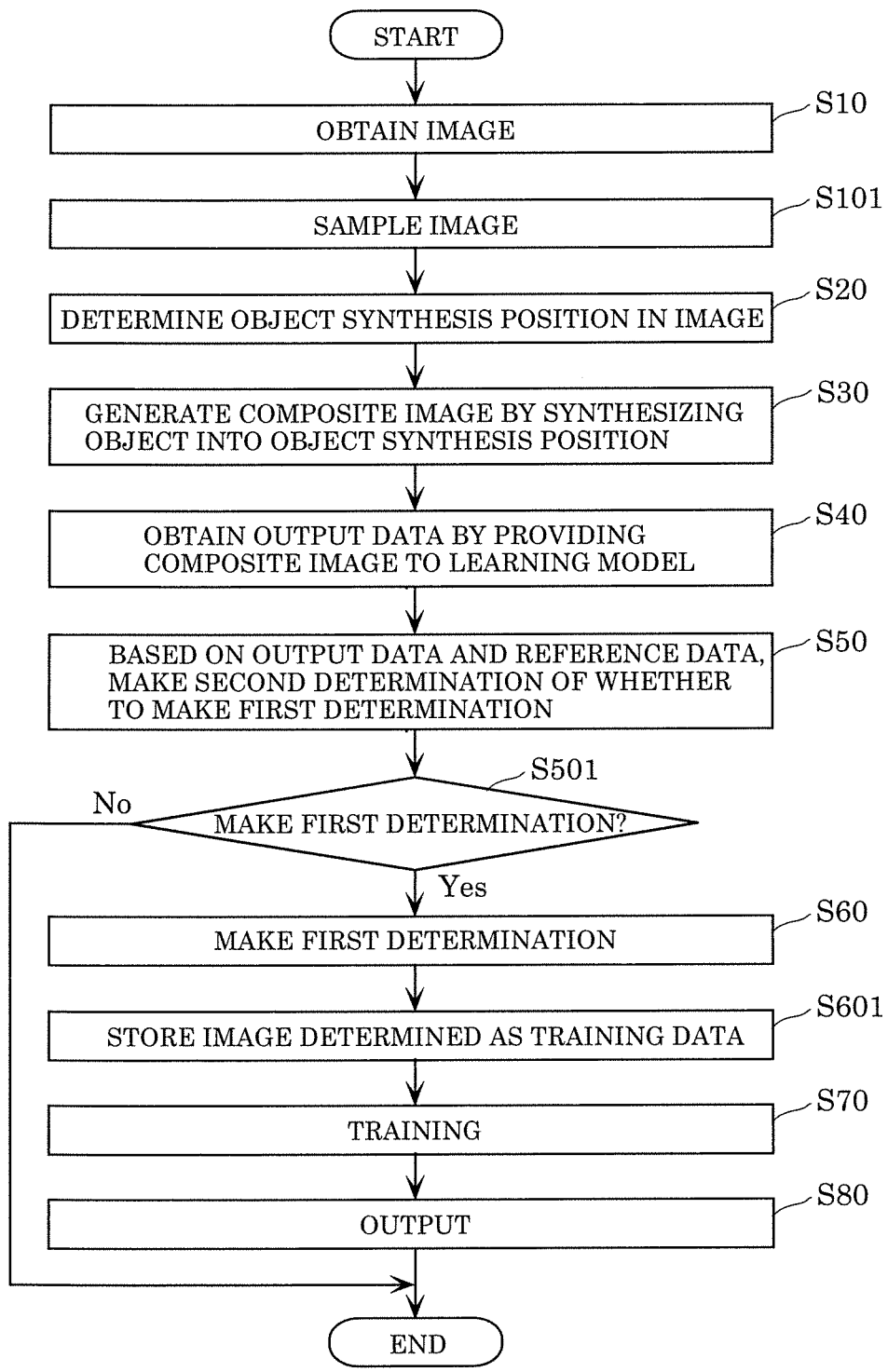
FIG. 7 is a flow chart illustrating exemplary steps of an information processing method according to variation 1.

The operation of information processing system 100 according to variation 1 will be described with reference to FIG. 7. FIG. 7 is a flow chart illustrating exemplary steps of the information processing method according to variation 1.

As shown in FIG. 7, in information processing system 100 according to variation 1, at step S10, image obtainer 110 obtains the image captured by imaging unit 210. Image obtainer 110 provides the obtained image to sampling unit 112.

Next, at step S101, sampling unit 112 receives images provided from image obtainer 110, and for example, periodically samples an image from the received images. Sampling unit 112 provides the sampled image to synthesis position setter 120.

Next, at step S20, synthesis position setter 120 receives the image provided from sampling unit 112, and determines the object synthesis position in the received image as desired. Synthesis position setter 120 provides the image having the determined object synthesis position to image synthesis unit 130.

Next, at step S30, image synthesis unit 130 synthesizes an object into the object synthesis position to generate a composite image. Image synthesis unit 130 uses, for example, a GAN model to synthesize the object into object synthesis position in the image. Image synthesis unit 130 provides the generated composite image to detection processing unit 140.

Next, at step S40, detection processing unit 140 receives the composite image provided from image synthesis unit 130, and obtains output data by providing the composite image to the recognition model stored in recognition model storage 142. Detection processing unit 140 provides the obtained output data to data usage determiner 150.

Next, at step S50, data usage determiner 150 makes a second determination based on reference data of the composite image and the output data obtained by providing the composite data to the recognition model. The second determination is to determine whether to make a first determination. It should be noted that the first determination is to determine training data based on the composite image. When it is determined in the second determination that the first determination is not made (No at step S501), the processing of the information processing method of determining the training data based on the composite image is terminated. On the other hand, when it is determined in the second determination to make the first determination (Yes at step S501), at step S60, data usage determiner 150 makes the first determination. In this case, data usage determiner 150 determines the training data based on the composite image. Data usage determiner 150 determines the composite image as the training data for the recognition model. Data usage determiner 150 also determines, as the training data for the recognition model, a corresponding image having the same or similar visual characteristics as the composite image. Next, at step S601, data usage determiner 150 stores the image determined as the training data, in training data storage 160 as the training data.

After a predetermined amount of training data is stored in training data storage 160, at step S70, training unit 170 trains the recognition model using the determined training data.

Next, at step S80, training unit 170 provides the recognition model trained using machine learning to recognition model storage 142 and recognition model transmitter 180. Recognition model storage 142 stores the trained recognition model provided from training unit 170, and thereby updates the recognition model. Furthermore, recognition model transmitter 180 transmits the trained recognition model provided from training unit 170 to recognition unit 220 of recognition processing unit 200.

It should be noted that the trained recognition model transmitted from recognition model transmitter 180 is received by recognition model receiver 3 of recognition unit 220, and is provided to recognition model updater 4. Recognition model updater 4 stores the trained recognition model received from recognition model receiver 3, and thereby updates the recognition model. Furthermore, when the trained recognition model is received by recognition model receiver 3, update information provider 5 provides a user with a notice related to completion of the training.

(Advantage Effect, Etc. Of Variation 1)

The foregoing information processing system 100 and information processing method according to variation 1 have the following advantageous effect as well as the advantageous effect described in the embodiment.

In the information processing method according to variation 1, in the first determination, the composite image is determined as the training data for the recognition model.

With this, the composite image determined to have a low recognition accuracy of the learning model can be used as the training data. Accordingly, it is prevented that data having a high recognition accuracy of the learning model, i.e. data unnecessary as training data, is accumulated as the training data. Therefore, the cost to accumulate data is reduced. In other words, images of a scene having a low recognition accuracy of the learning model can be mainly accumulated as training data, and thus it is possible to efficiently learn for the scene having the low recognition accuracy. Thus, the recognition accuracy of the learning model is further improved.

In the information processing method according to variation 1, in the first determination, a corresponding image having the same or similar visual characteristics as the composite image is determined as training data for the model. In this case, the visual characteristics of the composite image are statistical characteristics of the image parameter of the composite image. Furthermore, the visual characteristics of the composite image are qualitative characteristics of the composite image.

As described above, the corresponding image having the same or similar visual characteristics as the composite image is determined as the training data, and thus an image of the scene having a low recognition accuracy of the learning model and an image of a scene similar to the foregoing image can be used as the training data. Accordingly, it is possible to efficiently increase variations and the number of training data items for the scene having a low recognition accuracy. It should be noted that when the corresponding image is a captured image, it is possible to improve the learning effect in comparison with the case where the composite image is used as the training data. Furthermore, when the visual characteristics are statistical characteristics of the image parameter of the composite image, it is possible to efficiently increase variations and the number of training data items from statistical point of view. Furthermore, when the visual characteristics are qualitative characteristics of the composite image, it is possible to efficiently increase variations and the number of training data items having characteristics that are difficult to be quantified.

Furthermore, in the information processing method according to variation 1, the visual characteristics of the composite image are an aspect of the object in the composite image, and the visual characteristics of the corresponding image are an aspect of a corresponding object having the same or similar attributes as the object. In this case, the aspect is a position of the object in the composite image. Furthermore, the aspect is a posture of the object.

With this, for example, when the object recognition accuracy of the learning model is determined to be low based on a difference in the object aspect such as the position or posture of the object in the composite image, the training data is determined based on the composite image. Accordingly, an image of the scene having a low recognition accuracy of the learning model and an image of a scene similar to the foregoing image can be used as the training data. With this, it is possible to efficiently increase variations and the number of training data items for the scene having a low recognition accuracy. The recognition model constructed using such training data is improved in the accuracy with which the object is recognized from the image.

Furthermore, the information processing method according to variation 1 further includes providing a notice to a user of the recognition model when it is determined in the second determination to make the first determination. Here, the notice is related to a request to train the recognition model using the determined training data, for example. Furthermore, the information processing method according to variation 1 further includes training of the recognition model using the determined training, and the notice is related to completion of the training.

With this, when the training data for the learning model is determined based on the composite image, the notice is provided to a user of the learning model, and thus the user can know there is a scene having an object unrecognizable by the learning model. Furthermore, when the notice is related to a request to train the learning model, the user can determine timing of training of the learning model. Furthermore, when the notice is related to completion of the training, the user can know that the learning model has been updated by the training.

Variation 2

(Configuration of Information Processing System According to Variation 2)

Figure 8:
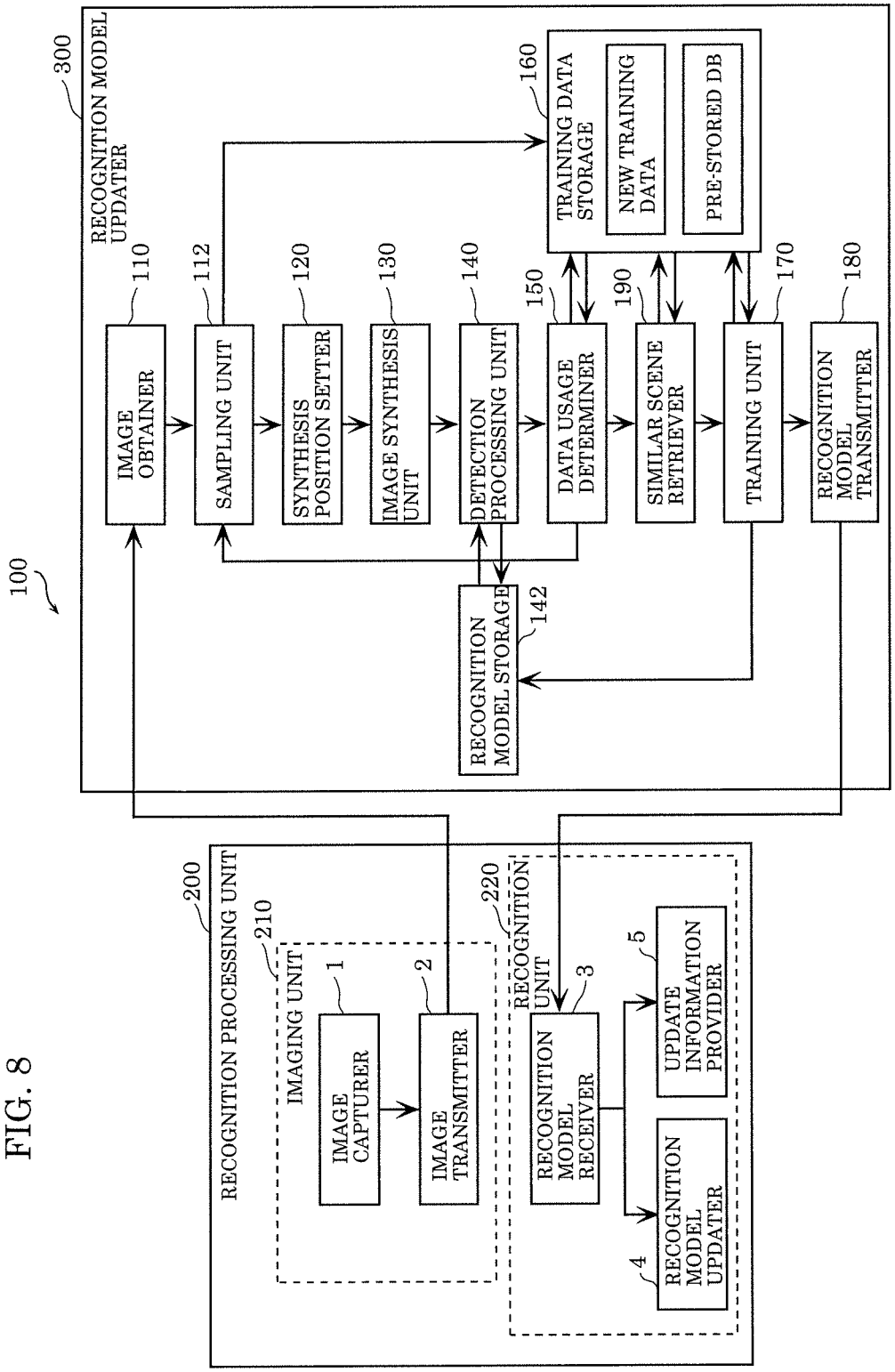
FIG. 8 is a block diagram illustrating an exemplary configuration of an information processing system according to variation 2.

An information processing system according to variation 2 of the embodiment will be described with reference to FIG. 8. FIG. 8 is a block diagram illustrating an exemplary configuration of information processing system 100 according to variation 2.

It should be noted that in information processing system 100 according to variation 1 of the embodiment, sampling unit 112 has been described as an exemplary sampling unit that periodically samples an image from the images obtained by image obtainer 110 and provides the sampled image to synthesis position setter 120. In variation 2, sampling unit 112 is described as an exemplary sampling unit that further samples an image satisfying a predetermined condition from the images obtained by image obtainer 110 and stores the sampled image in training data storage 160 as the training data. The following describes information processing system 100 according to variation 2, mainly about differences from information processing system 100 according to variation 1.

In information processing system 100 according to variation 2, an image having the same or similar visual characteristics as the composite image may be selected as the corresponding image from among captured images different from the composite image. It should be noted that the selection from among the captured images may be to sample an image based on the predetermined condition from among the images obtained by image obtainer 110, or to retrieve and extract a desired captured image from among the captured images stored in training data storage 160. Sampling unit 112 periodically samples an image from the images obtained by image obtainer 110 and provides the sampled image to synthesis position setter 120. Sampling unit 112 further samples an image satisfying a predetermined condition from among the images obtained by image obtainer 110 and stores the sampled image in training data storage 160 as the training data. Here, the predetermined condition is a condition based on a scene having a low object recognition accuracy of the recognition model, and includes, for example, a type of the object, a position of the object, an aspect of the object, a lighting condition, a weather condition, climate, arrangement of the building, a road condition, etc. For example, when data usage determiner 150 makes the second determination to determine the training data based on the composite image, i.e. to make the first determination, the predetermined condition is configured to include an amount of characteristic of an image having the same or similar visual characteristics as the composite image. With this, sampling unit 112 updates the predetermined condition to sample, as the training data, the same or similar image as the image having a low object recognition accuracy of the recognition model.

When the second determination is made to make the first determination, data usage determiner 150 determines the predetermined condition to include the amount of characteristic of an image having the same or similar visual characteristics as the composite image, and provides this condition to sampling unit 112.

Furthermore, information processing system 100 according to variation 2 differs from information processing systems 100 according to the foregoing embodiment and variation 1 in that similar scene retriever 190 (similar scene retrieving unit 190) is included. For example, when data usage determiner 150 makes the second determination to make the first determination, similar scene retriever 190 selects an image having the same or similar visual characteristics as the composite image from among the captured images stored in training data storage 160. The same or similar visual characteristics as the composite image include, for example, the object synthesis position in the image, the image background, the aspect of the synthesized object such as the posture of a person, statistical characteristics of the image parameter such as image color tone and image edge, and qualitative characteristics such as the weather condition, the wet load surface, and occlusion. The captured image may be a captured image selected by sampling unit 112 and stored as new training data, or may be a captured image included in pre-stored DB. It should be noted that the pre-stored DB includes images of various scenes stored as default in the information processing system. The images of various scenes includes, for example, images captured in different climate areas, different images in weather, road condition, landscape, etc., and different images in the object aspect such as an object position in the image, a type of the object, and a posture of the object. Furthermore, for example, when a storage for temporarily storing images obtained by image obtainer 110 is provided, the captured image may be selected from among the images temporarily stored in this storage.

(Operation of Information Processing System According to Variation 2)

Figure 9:
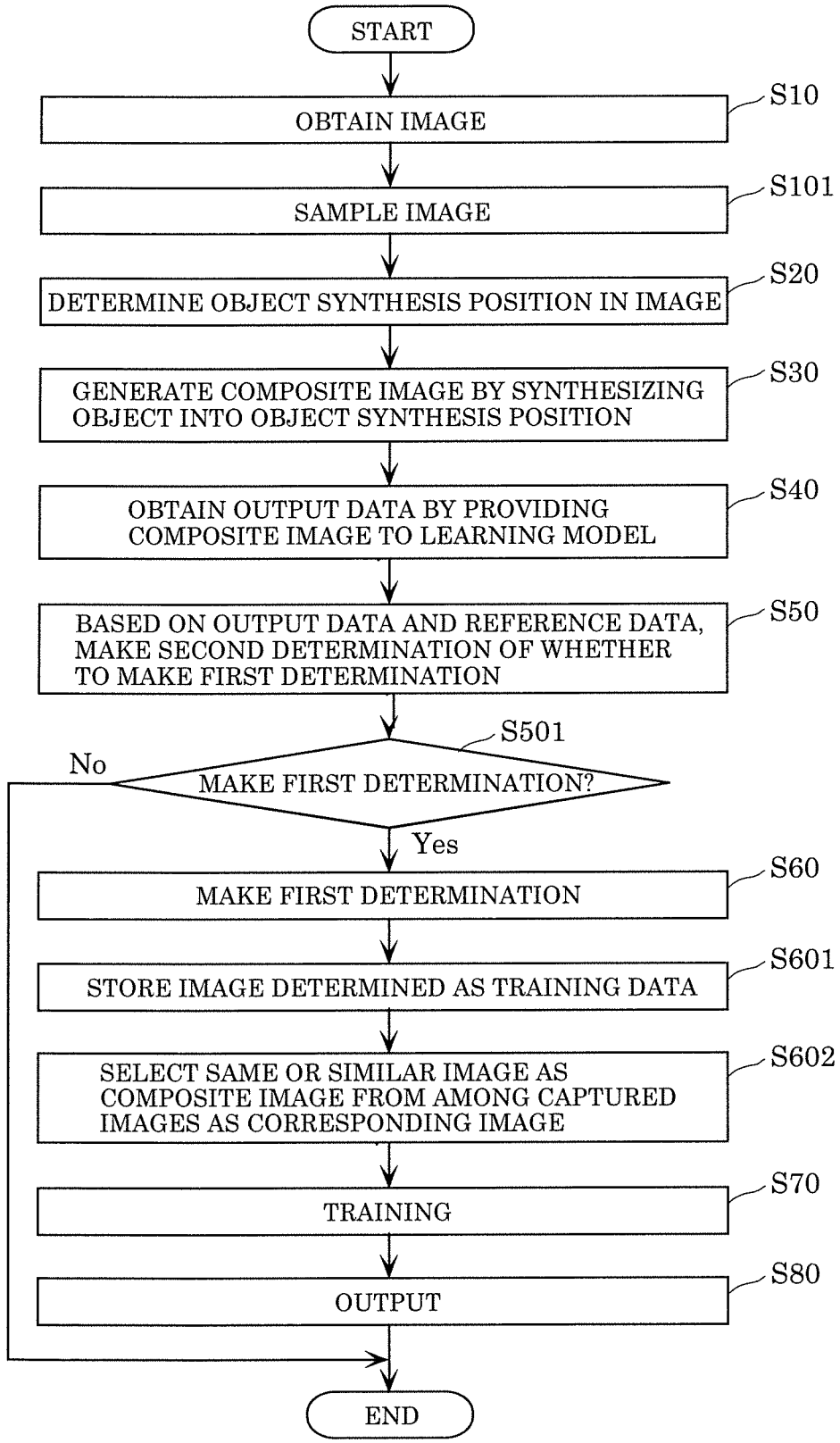
FIG. 9 is a flow chart illustrating exemplary steps of an information processing method according to variation 2.

The operation of information processing system 100 according to variation 2 will be described with reference to FIG. 9. FIG. 9 is a flow chart illustrating exemplary steps of the information processing method according to variation 2.

In information processing system 100 according to variation 1 of the embodiment, sampling unit 112 periodically samples an image from the images obtained by image obtainer 110 and provides the sampled image to synthesis position setter 120. In information processing system 100 according to variation 2 of the embodiment, besides the above action, sampling unit 112 samples an image satisfying a predetermined condition from among the images obtained by image obtainer 110 and stores the sampled image in training data storage 160 as the training data. Similar scene retriever 190 selects an image having the same or similar visual characteristics as the composite image from among the captured images stored in training data storage 160 as new training data and the captured images stored in the pre-stored DB. In information processing system 100 according to variation 2, the recognition model is constructed using a set of images including these captured images as training data. The following describes variation 2, mainly about differences from the embodiment and variation 1.

More specifically, at step S101, besides the same action as step S101 of variation 1, sampling unit 112 samples an image satisfying a predetermined condition from among the images obtained at step S10 and stores the sampled image in training data storage 160. Next, like the embodiment and variation 1, information processing system 100 performs steps S20 though S60. Although not shown, in variation 2, when the second determination is made to make the first determination, data usage determiner 150 determines the predetermined condition to include the amount of characteristic of an image having the same or similar visual characteristics as the composite image, and provides this condition to sampling unit 112. When receiving the condition, sampling unit 112 updates the predetermined condition by storing the received condition in sampling unit 112.

Next, at step S602, similar scene retriever 190 retrieves, as the corresponding images, the same or similar images as the composite image of when the second determination is made to make the first determination from among the captured images stored in training data storage 160, and selects a desired captured image as training data. Next, like variation 1, information processing system 100 performs steps S70 and S80.

(Advantage Effect, Etc. of Variation 2)

The foregoing information processing system 100 and information processing method according to variation 2 have the following advantageous effect as well as the advantageous effects described in the embodiment and variation 1.

In the information processing method according to variation 2, an image having the same or similar visual characteristics as the composite image is selected as the corresponding image from among captured images different from the composite image. It should be noted that the selection from among the captured images may be to sample an image based on the predetermined condition from among the images obtained by image obtainer 110, or to retrieve and extract a desired captured image from among the captured images stored in a memory such as training data storage 160, a data base, etc.

With this, the captured image can be used as the training data. Accordingly, it is possible to have a higher learning effect than the case where the composite image is used as the training data. It should be noted that the selection from among the captured images may be to determine whether an image is stored based on the predetermined condition every time the image is obtained, to sample an image from among the obtained images based on the predetermined condition, or to retrieve and extract a captured image satisfying the predetermined condition from among the captured images stored in a memory, a data base, etc.

Variation 3

(Configuration of Information Processing System According to Variation 3)

Figure 10:
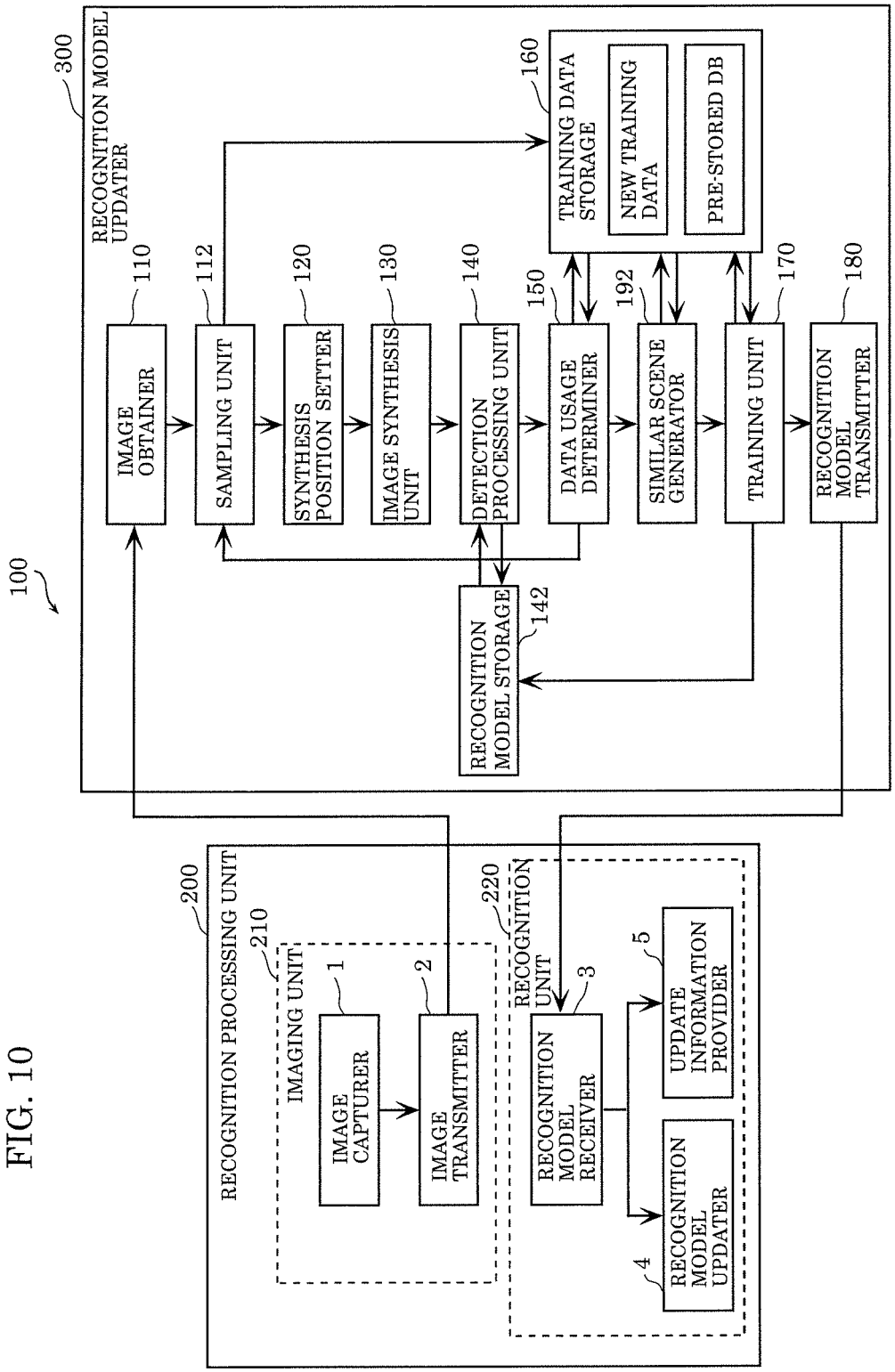
FIG. 10 is a block diagram illustrating an exemplary configuration of an information processing system according to variation 3.

An information processing system according to variation 3 of the embodiment will be described with reference to FIG. 10. FIG. 10 is a block diagram illustrating an exemplary configuration of information processing system 100 according to variation 3.

It should be noted that information processing system 100 according to variation 2 of the embodiment includes similar scene retriever 190. When data usage determiner 150 makes the second determination to make the first determination, similar scene retriever 190 retrieves the same or similar images as the composite image from among the captured images stored in training data storage 160, and selects a desired captured image as training data. Information processing system 100 according to variation 3 includes not similar scene retriever 190 but similar scene generator 192 (similar scene generating unit 192). The following describes information processing system 100 according to variation 3, mainly about differences from information processing system 100 according to variation 2.

In information processing system 100 according to variation 3, an image having the same or similar visual characteristics as the composite image may be generated as the corresponding image from the captured image different from the composite image.

For example, when data usage determiner 150 makes the second determination to make the first determination, similar scene generator 192 generates an image having the same or similar visual characteristics as the composite image from the captured image stored in training data storage 160.

(Operation of Information Processing System According to Variation 3)

The operation of information processing system 100 according to variation 3 will be described with reference to FIG. 11. FIG. 11 is a flow chart illustrating exemplary steps of an information processing method according to variation 3.

In the information processing system according to variation 2 of the embodiment, when data usage determiner 150 makes the second determination to make the first determination, similar scene retriever 190 selects an image having the same or similar visual characteristics as the composite image, i.e. an image similar to the composite image, from among the captured images stored in training data storage 160. In the information processing system according to variation 3 of the embodiment, when data usage determiner 150 makes the second determination to make the first determination, similar scene generator 192 generates an image having the same or similar visual characteristics as the composite image, i.e. an image similar to the composite image, from the captured image stored in training data storage 160. The following describes variation 3, mainly about differences from variations 1 and 2.

More specifically, at step S603, a captured image of a similar scene, i.e. an image of a scene similar to the composite image of when the second determination is made to make the first determination is generated as the corresponding image by retouching the captured image stored in training data storage 160 and different from the composite image.

(Advantage Effect, Etc. of Variation 3)

The foregoing information processing system 100 and information processing method according to variation 3 have the following advantageous effect as well as the advantageous effects described in the embodiment and variation 1.

In the information processing method according to variation 3, an image having the same or similar visual characteristics as the composite image is generated as the corresponding image from the captured image different from the composite image.

With this, the corresponding image can be generated from a captured image. More specifically, an image of a scene having a low object recognition accuracy of the learning model and an image similar to this scene can be generated from the captured image. With this, the corresponding image can be generated even when the captured image is unavailable as the corresponding image without change, and thus it is possible to easily increase variations and the number of training data items.

Other Variations

As described above, the embodiment and the variations have been described as examples of technique disclosed in this application. However, the technique of this application is not limited to these examples, and may be applied to other embodiments or other variations of the embodiment in which change, replacement, addition, omission, etc., is appropriately made. Furthermore, it is possible to combine the constituent elements described in the embodiment and the variations to make a new embodiment or variation.

Information processing system 100 according to the embodiment and the variations has been described as being applied to a car. The information processing system may be applied to any systems as long as it recognizes a recognition target from sensing data. For example, the information processing system may be applied to a system which monitors an action or state of a person in a building such as a home or an office. In this case, recognition processing unit 200 is included in a sensor module such as a camera, and recognition model updater 300 may be included in the sensor module or a device separate from the sensor module such as a server.

Furthermore, in the embodiment, a processing target has been described as an image, but the processing target may be sensing data other than the image. For example, the processing target may be sensing data for which reference data can be obtained, including sound data from a microphone, point group data from radar such as LiDAR, pressure data from a pressure sensor, temperature or humidity data from a temperature or humidity sensor, flavor data from a flavor sensor, etc. For example, when the sensing data is sound data, an element of the sound data includes frequency, amplitude, etc. The statistical characteristics of the element of the sound data are a frequency band, acoustic pressure, etc., and the qualitative characteristics of the sound data are noise, background sound, etc.

It is to be noted that this general or specific aspect may be implemented using a system, a device, a method, an integrated circuit, a computer program, or a recording medium such as a computer readable recording disc, or any combination of systems, devices, methods, integrated circuits, computer programs, or recording media. The computer readable recording medium includes a non-volatile recording medium such as a compact disc-read only memory (CD-ROM), for example.

For example, the constituent elements in information processing system 100 according to the embodiment and the variations are typically implemented as a large-scale integration (LSI) circuit, which is an integrated circuit. These may be integrated into separate chips, or some or all of them may be integrated into a single chip. The integration may be achieved, not only as a LSI, but also as a dedicated circuit or a general purpose processor. Also applicable is a field programmable gate array (FPGA), which allows post-manufacture programming, or a reconfigurable processor LSI, which allows reconfiguration of connection and setting of circuit cells therein.

Each of the constituent elements in the embodiment and the variations may be configured in the form of an exclusive hardware product, or may be realized by executing a software program suitable for the constituent element. Each of the constituent elements may be realized by means of a program executing unit, such as a CPU and a processor, reading and executing the software program recorded on a recording medium such as a hard disk or a semiconductor memory.

Furthermore, a part or all of the constituent elements may be configured as an integrated circuit (IC) card or a stand-alone module. The IC card or the module is a computer system configured from a microprocessor, a ROM, a RAM, etc. The IC card or the module also may include the foregoing LSI or system LSI. The IC card or the module achieves its function through the microprocessor's operation according to the computer program. The IC card or the module also may be implemented to be tamper-resistant.

It should be noted that the above method may be implemented by a MPU, a CPU, a processor, a circuit such a LSI, an IC, a stand-alone module, or the like.

Furthermore, the technique of the present disclosure may be achieved by a software program or a digital signal resulting from the software program, or may be a non-transitory computer-readable recoding medium storing the program.

It should be noted that the above program or digital signal may be stored in a computer readable recording medium such as flexible disc, a hard disk, a SSD, a CD-ROM, an MO, a DVD, a DVD-ROM, a DVD-RAM, a Blu-ray (registered mark) Disc (BD), and a semiconductor memory. Furthermore, the above program or digital signal may be transmitted via a telecommunication line, a wireless or wired communication line, a network represented by the Internet, a data broadcast, etc. Furthermore, the above program or digital signal may be implemented using another independent computer system by being recorded and transferred on a recording media or by being transferred via a network, etc.

Furthermore, all the foregoing numbers such as an ordinal number and a quantity are examples for illustrating the technique of the present disclosure, and the present disclosure is not limited to the foregoing numbers. Furthermore, the relation of connection between the constituent elements is an example for illustrating the technique of the present disclosure, and the relation of connection for achieving the functionality of the present disclosure is not limited to this.

Furthermore, the partition of function blocks in the block diagram is an example, and the function blocks may be integrated into a single function block, a single function block may be divided into some blocks, or a part of the function may be transferred to another function block. Furthermore, functions of the function blocks having similar functions may be processed by a single hardware or software in parallel or in a time division method.

The present disclosure is applicable to a technique such as an automatic driving system, a traffic management system, a security system, and a manufacturing control system since it is possible to improve the individual training efficiency of a learning model.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An information processing method, comprising the following performed using a computer:
   obtaining sensing data pieces from a sensor;
   determining a synthesis region in a first sensing data piece in which a recognition target data piece is to be synthesized with the first sensing data piece;
   generating a composite data piece by synthesizing the recognition target data piece into the synthesis region of the first sensing data piece, wherein the recognition target data piece has same or similar perceived characteristics perceived by a human sensory system as the first sensing data piece;
   obtaining recognition result data by providing the composite data piece to a neural network which has been trained using machine learning to recognize a recognition target, wherein the recognition target data piece of the composite data piece includes a data piece of a first object corresponding to the recognition target, wherein the recognition result data indicates a recognition result of the first object recognized by the neural network;
   judging whether a recognition accuracy of the first object is lower than a threshold, wherein the recognition accuracy of the first object is calculated based on the recognition result data and reference data including at least the synthesis region;
   determining two or more training data pieces to update the neural network based on the composite data piece when it is judged that the recognition accuracy of the first object is lower than a threshold; and
   updating the neural network using the two or more training data pieces,
   wherein, the determining determines, as the two or more training data pieces, (i) a first corresponding data piece being a second sensing data piece which is selected from among the sensing data pieces obtained from the sensor and which includes a data piece of a second object having same or similar characteristics as the first object in the composite data piece, of which the recognition accuracy is determined to be lower than the threshold and (ii) a second corresponding data piece which is generated from a third sensing data piece among the sensing data pieces obtained from the sensor and which includes the data piece of the second object.

2. The information processing method according to claim 1, wherein
   the perceived characteristics of the first sensing data piece are statistical characteristics of an element of the first sensing data piece.

3. The information processing method according to claim 1, wherein
   the perceived characteristics of the first sensing data piece are qualitative characteristics of the first sensing data piece.

4. The information processing method according to claim 1, wherein
   the perceived characteristics of the composite data are statistical characteristics of an element of the composite data.

5. The information processing method according to claim 1, wherein
   the perceived characteristics of the composite data are qualitative characteristics of the composite data.

6. The information processing method according to claim 1, wherein
   the sensor is a camera,
   the sensing data pieces are images which are captured by the camera,
   the first sensing data piece is a first image being one of the images,
   the synthesis region is a synthesis position in the first image in which an image of the first object is synthesized with the first image,
   the composite data piece is a composite image generated by synthesizing the image of the first object into the synthesis position, the image of the first object having same or similar visual characteristics as the first image,
   the two or more training data pieces are two or more training images,
   the determining determines, as the two or more training images, (i) a first corresponding image being a second image which is selected from among the images captured by the camera and which includes an image of the second object having same or similar characteristics as the first object in the composite image and (ii) a second corresponding image which is generated from a third image among the images captured by the camera and which includes the image of the second object.

7. The information processing method according to claim 6, wherein
   the first corresponding image and the second corresponding image, determined as the two or more training images, have same or similar visual characteristics as the composite image,
   the visual characteristics of the composite image are an aspect of the first object in the composite image, and
   the visual characteristics of each of the first corresponding image and the second corresponding image are an aspect of the second object having same or similar attributes as the first object.

8. The information processing method according to claim 7, wherein
   the aspect is a first position of the first object in the composite image.

9. The information processing method according to claim 7, wherein
   the aspect of the first object is a first posture of the first object, and
   the aspect of the second object is a second posture of the second object.

10. The information processing method according to claim 6, wherein the synthesis region further includes a size of the recognition target image synthesized with the first image.

11. The information processing method according to claim 1, wherein
a generative adversarial network (GAN) model is used to synthesize the recognition target data piece into the synthesis region.

12. The information processing method according to claim 1, further comprising:
providing a notice to a user of the neural network when it is judged that the recognition accuracy of the first object is lower than the threshold.

13. The information processing method according to claim 12, wherein
the notice is related to completion of the training.

14. The information processing method according to claim 12, wherein
the notice is related to a request to train the neural network using the two or more training data pieces determined.

15. The information processing method according to claim 1, further comprising:
storing the two or more training data pieces to a storage of the computer; and
judging whether a total predetermined amount of the two or more training data pieces stored in the storage is a predetermined amount,
wherein the updating updates the neural network using the two or more training data pieces stored in the storage when it is judged that the total predetermined amount of the two or more training data pieces stored in the storage is the predetermined amount.

16. A non-transitory recording medium storing a program for causing a computer to execute the information processing method according to claim 1.

17. An information processing system, comprising:
a processor; and
a memory that stores a program,
wherein when the program is executed by the processor, the program causes the processor to execute:
obtaining sensing data pieces from a sensor;
determining a synthesis region in a first sensing data piece in which a recognition target data piece is to be synthesized with the first sensing data piece;
generating a composite data piece by synthesizing the recognition target data piece into the synthesis region of the first sensing data piece, wherein the recognition target data piece has same or similar perceived characteristics perceived by a human sensory system as the sensing data piece;
obtaining recognition result data by providing the composite data piece to a neural network which has been trained using machine learning to recognize a recognition target, wherein the recognition target data piece of the composite data piece includes a data piece of a first object corresponding to the recognition target, wherein the recognition result data indicates a recognition result of the first object recognized by the neural network;
judging whether a recognition accuracy of the first object is lower than a threshold, wherein the recognition accuracy of the first object is calculated based on the recognition result data and reference data including at least the synthesis region;
determining two or more training data pieces to update the neural network based on the composite data piece when it is judged that the recognition accuracy of the first object is lower than a threshold; and
updating the neural network using the two or more training data pieces,
wherein, the determining determines, as the two or more training data pieces, (i) a first corresponding data piece being a second sensing data piece which is selected from among the sensing data pieces obtained from the sensor and which includes a data piece of a second object having same or similar characteristics as the first object, in the composite data piece, of which the recognition accuracy is determined to be lower than the threshold and (ii) a second corresponding data piece which is generated from a third sensing data piece among the sensing data pieces obtained from the sensor and which includes the data piece of the second object.

18. The information processing system according to claim 17, further comprising:
storing the two or more training data pieces to a storage of the information processing system; and
judging whether a total predetermined amount of the two or more training data pieces stored in the storage is a predetermined amount,
wherein the updating updates the neural network using the stored two or more training data pieces stored in the storage when it is judged that total predetermined amount of the two or more training data pieces stored in the storage is the predetermined amount.

* * * * *